US011323146B2

(12) United States Patent
Na

(10) Patent No.: US 11,323,146 B2
(45) Date of Patent: May 3, 2022

(54) DEVICE AND METHOD FOR CALIBRATING COMMUNICATION MODULE

(71) Applicant: Samsung Electronics Co., Ltd., Gyeonggi-do (KR)

(72) Inventor: Hyoseok Na, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/041,858

(22) PCT Filed: Mar. 29, 2019

(86) PCT No.: PCT/KR2019/003691
§ 371 (c)(1),
(2) Date: Sep. 25, 2020

(87) PCT Pub. No.: WO2019/190257
PCT Pub. Date: Oct. 3, 2019

(65) Prior Publication Data
US 2021/0013920 A1 Jan. 14, 2021

(30) Foreign Application Priority Data

Mar. 29, 2018 (KR) .......................... 10-2018-0036709

(51) Int. Cl.
*H04B 1/401* (2015.01)
*H04B 17/14* (2015.01)
(Continued)

(52) U.S. Cl.
CPC ........... *H04B 1/401* (2013.01); *H04B 1/0483* (2013.01); *H04B 1/44* (2013.01); *H04B 17/14* (2015.01)

(58) Field of Classification Search
CPC ........ H04B 1/0483; H04B 1/38; H04B 1/401; H04B 1/44; H04B 1/52; H04B 1/58;
(Continued)

(56) References Cited

U.S. PATENT DOCUMENTS

2008/0051134 A1   2/2008  Brobston et al.
2008/0181186 A1*  7/2008  Rofougaran ...... H04L 12/40006
                                                  370/338
(Continued)

FOREIGN PATENT DOCUMENTS

KR   1020130047639   5/2013
KR   1020170006639   1/2017

OTHER PUBLICATIONS

PCT/ISA/210 Search Report issued on PCT/KR2019/003691, dated Jul. 5, 2019, pp. 5.
(Continued)

*Primary Examiner* — Young T. Tse
(74) *Attorney, Agent, or Firm* — The Farrell Law Firm, P.C.

(57) ABSTRACT

An electronic device according to various embodiments of the present invention can comprise: a housing; a first antenna element positioned inside the housing or at a first position thereof; a second antenna element positioned inside the housing or at a second position separated from the first position thereof; and a wireless communication circuit positioned inside the housing and electrically coupled to the first antenna element and the second antenna element. The wireless communication circuit comprises: a wireless modem; a source RF circuit electrically connected to the wireless modem, and configured to generate an IF signal; and a second RF circuit positioned at a fourth position closer to the second position than to the first position, wherein: each of the first RF circuit and the second RF circuit is configured to alternately receive an IF signal for transmitting a transmitted signal via the first antenna element and the second antenna element, and includes a first electrical path between the source RF circuit and the second RF circuit, a second electrical path between the source RF circuit and the second RF circuit, and a third electrical path between the first RF (Continued)

circuit and the second RF circuit; the first RF circuit, while being electrically blocked from the first antenna element, is configured to form at least a portion of a first loopback path from the first RF circuit to the source RF circuit through the third electrical path and the second electrical path; and the second RF circuit, while being electrically blocked from the second antenna element, can be configured to form at least a portion of a second loopback path from the second RF circuit to the source RF circuit through the third electrical path and the first electrical path. Additional other embodiments are also possible.

13 Claims, 10 Drawing Sheets

(51) Int. Cl.
*H04B 1/04* (2006.01)
*H04B 1/44* (2006.01)

(58) Field of Classification Search
CPC . H04B 3/46; H04B 3/50; H04B 17/11; H04B 17/14; H04B 17/21
USPC ....... 375/219, 220, 222, 224, 260, 262, 265, 375/267, 268, 279; 370/310.2, 328, 334; 455/500, 67.11, 67.14, 68, 73, 78, 88
See application file for complete search history.

(56) References Cited

U.S. PATENT DOCUMENTS

| | | |
|---|---|---|
| 2012/0009886 A1* | 1/2012 | Poulin ................. H04B 7/0825 455/78 |
| 2013/0109324 A1* | 5/2013 | Garrett ................ H04B 7/0408 455/73 |
| 2014/0170990 A1* | 6/2014 | Black ..................... H04B 1/401 455/73 |
| 2014/0242914 A1 | 8/2014 | Monroe |
| 2016/0021547 A1* | 1/2016 | Wang .................... H04W 16/26 370/328 |
| 2016/0254895 A1* | 9/2016 | Smadi ................... H04W 28/26 370/328 |
| 2017/0012349 A1 | 1/2017 | Lee et al. |
| 2017/0104516 A1 | 4/2017 | Maltsev et al. |
| 2017/0257837 A1 | 9/2017 | Lee et al. |
| 2017/0279479 A1 | 9/2017 | Adams et al. |
| 2018/0048345 A1* | 2/2018 | Pehlke ..................... H04B 1/40 |

OTHER PUBLICATIONS

PCT/ISA/237 Written Opinion issued on PCT/KR2019/003691, dated Jul. 5, 2019, pp. 5.
Korean Office Action dated Nov. 18, 2021 issued in counterpart application No. 10-2018-0036709, 15 pages.

* cited by examiner

DEVICE AND METHOD FOR CALIBRATING COMMUNICATION MODULE

PRIORITY

This application is a National Phase Entry of International Application No. PCT/KR2019/003691, which was filed on Mar. 29, 2019, and claims priority to Korean Patent Application No. 10-2018-0036709, filed in the Korean Intellectual Property Office on Mar. 29, 2018, the content of each of which is incorporated herein by reference.

TECHNICAL FIELD

Various embodiments of the present disclosure relate to a device and method for calibrating a wireless communication module of an electronic device.

BACKGROUND ART

To meet a demand for wireless data traffic that is on the trend of increase after the commercialization of 4th-generation (4G) communication systems, an effort to develop improved 5th-generation (5G) communication systems or pre-5G communication systems is being made. For this reason, the 5G communication systems or the pre-5G communication systems are denoted as beyond 4G network communication systems or post long term evolution (Post LTE) systems.

To achieve a high data transmission rate, the 5G communication systems are considering implementation at a band of ultra-high frequency (mmWave) (for example, a band of 60 Giga Hertz (GHz)). To alleviate a path loss of radio waves at the ultra-high frequency band and increase a propagation distance of the radio waves, the 5G communication systems are discussing beamforming, massive multiple input multiple output (MIMO), full dimensional-MIMO (FD-MIMO), array antenna, analog beamforming, and large scale antenna technologies.

Also, for the purpose of system network improvement, the 5G communication systems are achieving the development of technologies such as an evolved small cell, an advanced small cell, a cloud radio access network (cloud RAN), an ultra-dense network, device to device communication (D2D), wireless backhaul, a moving network, cooperative communication, coordinated multi-points (CoMP), and received interference cancellation, etc.

In addition to this, the 5G systems are developing advanced coding modulation (ACM) schemes such as hybrid frequency shift keying and quadrature amplitude modulation (FQAM) and sliding window superposition coding (SWSC), and advanced connection technologies such as filter bank multi carrier (FBMC), non-orthogonal multiple access (NOMA), and sparse code multiple access (SCMA), etc.

DISCLOSURE OF INVENTION

Technical Problem

In a wireless communication using an ultra-high frequency, an internal calibration of an electronic device can be required for exact signal transmission and/or reception. By each connecting a path for transmitting a signal to one antenna module and a path for receiving a signal from the one antenna module through a connection member, the electronic device can perform the internal calibration, but a mounting space may be deficient according to the attenuation of RF performance and/or the size of the connection member.

Also, the electronic device may use an external member (e.g., a waveguide) in order to perform the internal calibration, or use a measurement equipment to perform the internal calibration. But, when failing to have the external member or the measurement equipment, the electronic device cannot perform the calibration of the electronic device. Accordingly, the electronic device may need a loopback path for performing the internal calibration.

According to various embodiments of the present disclosure, an electronic device may include a plurality of electrical paths, and form at least a part of a loopback path by using at least a part of a non-used path among the plurality of electrical paths.

Solution to Problem

An electronic device of various embodiments of the present disclosure may include a housing, a first antenna element positioned inside the housing or at a first position thereof, a second antenna element positioned inside the housing or at a second position separated from the first position, and a wireless communication circuit positioned inside the housing, and electrically coupled with the first antenna element and the second antenna element. The wireless communication circuit may include a wireless modem, a source RF circuit electrically connected to the wireless modem, and configured to provide an IF signal, and a second RF circuit positioned at a fourth position closer to the second position than the first position. The first RF circuit and the second RF circuit each may be configured to alternately receive an IF signal for transmitting a transmitted signal, via the first antenna element and the second antenna element, and include a first electrical path between the source RF circuit and the first RF circuit, a second electrical path between the source RF circuit and the second RF circuit, and a third electrical path between the first RF circuit and the second RF circuit. The first RF circuit may be configured to, while being electrically blocked from the first antenna element, form at least a part of a first loopback path, from the first RF circuit to the source RF circuit, via the third electrical path and the second electrical path. The second RF circuit may be configured to, while being electrically blocked from the second antenna element, form at least a part of a second loopback path, from the second RF circuit to the source RF circuit, via the third electrical path and the first electrical path.

An electronic device of various embodiments of the present disclosure may include a first communication device, a second communication device, a source RF circuit, a first connection member configured to connect the source RF circuit and the first communication device, a second connection member configured to connect the source RF circuit and the second communication device, a third connection member configured to connect the first communication device and the second communication device, a wireless modem operatively (or operably) coupled with the source RF circuit, and a housing including the wireless modem, the source RF circuit, the first communication device, the second communication device, and the first to the third connection members. The source RF circuit may be configured to present a first signal received from the wireless modem, to the first communication device via the first connection member. The first communication device may be configured to present a second signal provided based on the first signal, to the second communication device via the third connection member. The second communication device may be configured to present a third signal provided based on the second signal, to the source RF circuit via the second connection member. The source RF circuit may be configured to present the third signal received from the second communication device, to the wireless modem.

An operation method of an electronic device of various embodiments of the present disclosure may include providing a first signal, transmitting the first signal to a first communication device via a first connection member, providing, by the first communication device, a second signal on the basis of the first signal, transmitting the second signal to a second communication device via a third connection member, providing, by the second communication device, a third signal on the basis of the second signal, and transmitting the third signal to a communication module via a second connection member. The first connection member may connect the communication module and the first communication device. The second connection member may connect the communication module and the second communication device. The third connection member may connect the first communication device and the second communication device.

Advantageous Effects of Invention

An electronic device and an operation method of the electronic device, of various embodiments, may optimize the performance of a wireless communication module of the electronic device, by calibrating the wireless communication module of the electronic device which uses an ultra-high frequency band such as a millimeter wave, and may reduce a variation between mass-produced wireless communication modules.

An electronic device and an operation method of the electronic device, of various embodiments, may perform the calibration of the electronic device without an external member or other measurement equipments, by connecting wireless communication modules of the electronic device through a connection member.

BEST MODE FOR CARRYING OUT THE INVENTION

Figure 1:
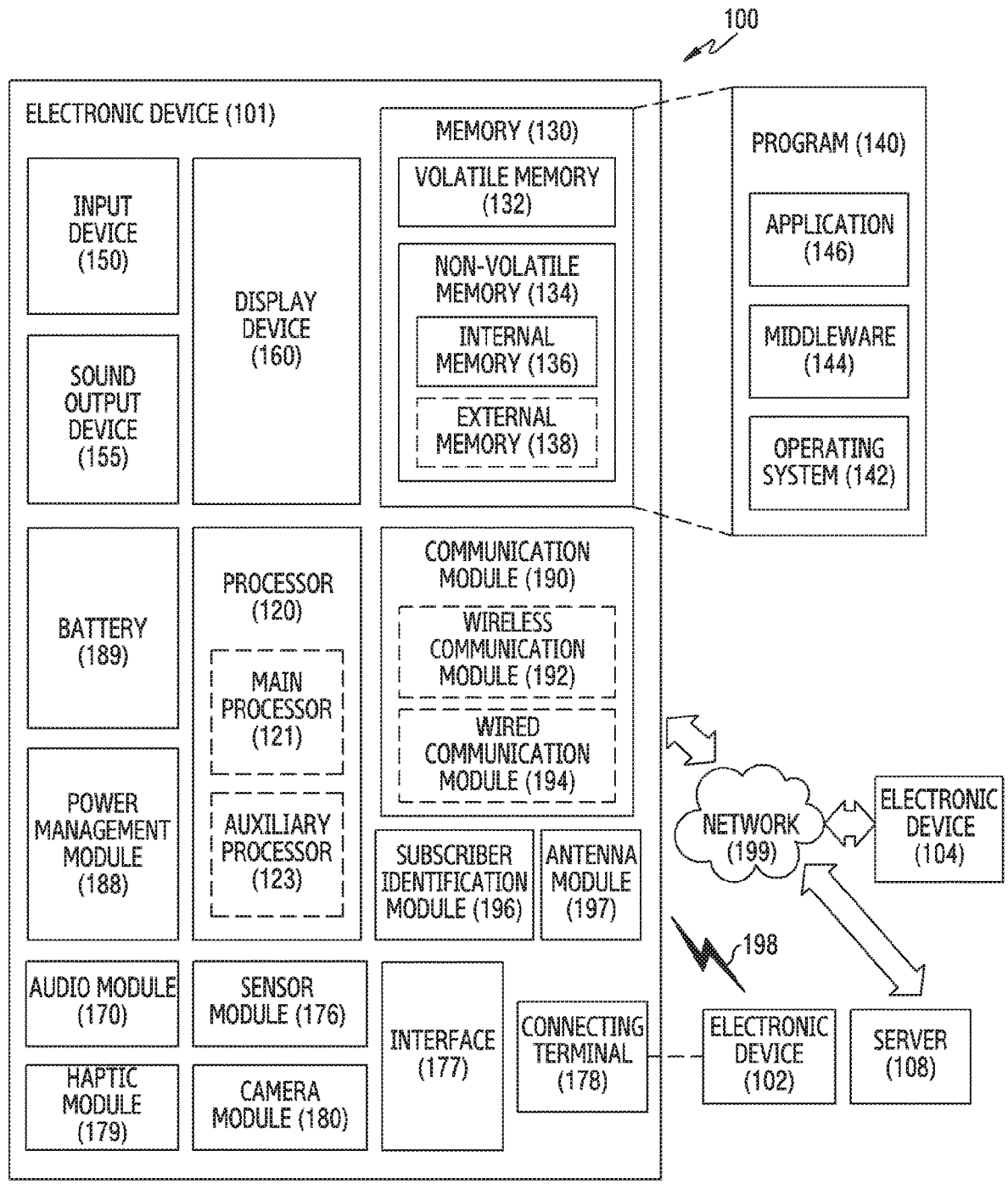
FIG. 1 is a block diagram of an electronic device within a network environment according to various embodiments of the present disclosure.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker. The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
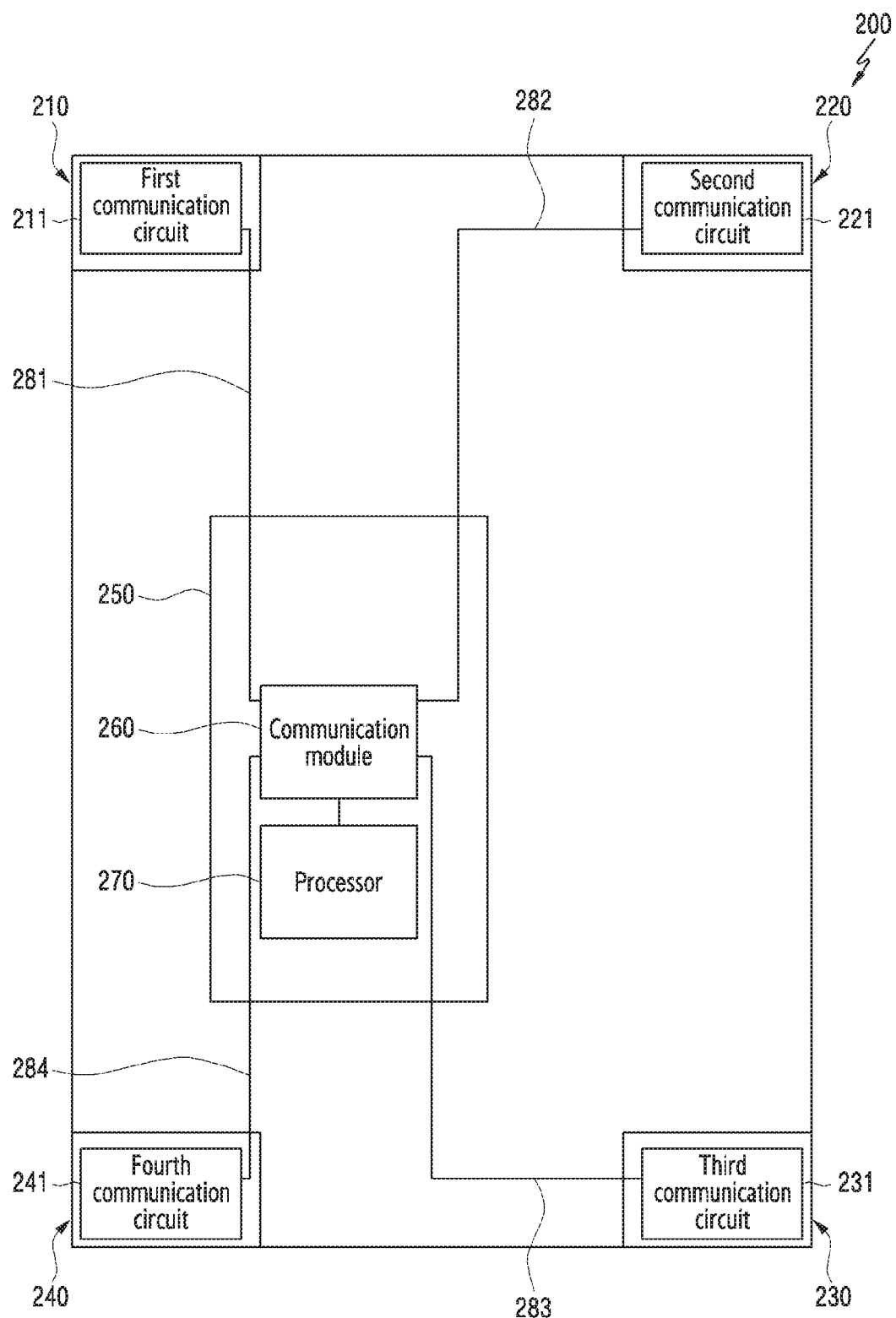
FIG. 2 illustrates an arrangement relationship of a communication device in an electronic device according to various embodiments of the present disclosure.

FIG. 2 is a diagram illustrating an arrangement relationship of a communication device in an electronic device according to various embodiments of the present disclosure.

The electronic device 200 of FIG. 2 may be at least in part similar to the electronic device 101 of FIG. 1, or include other embodiments of the electronic device.

Referring to FIG. 2, the electronic device 200 may include a first communication circuit 211, a second communication circuit 221, a third communication circuit 231, a fourth communication circuit 241, a communication module 260, a first communication device 210, a second communication device 220, a third communication device 230, a fourth communication device 240, a printed circuitry board (below, PCB) 250, or a processor 270.

A communication device (e.g., the first communication device 210, the second communication device 220, the third communication device 230, or the fourth communication device 240) of various embodiments may include a communication circuit (e.g., the first communication circuit 211, the second communication circuit 221, the third communication circuit 231, or the fourth communication circuit 241), a PCB (not shown), or an array antenna (not shown). In accordance with various embodiments, the communication device may be denoted as an antenna element as well.

The first communication circuit 211, the second communication circuit 221, the third communication circuit 231, or the fourth communication circuit 241, of various embodiments may receive a signal from an external device or a base station, and down convert a frequency band of the signal which has been received on a radio frequency (RF) band, into an intermediate frequency (IF) band. For another example, the first communication circuit 211, the second communication circuit 221, the third communication circuit 231, or the fourth communication circuit 241 may receive a signal of an IF band from the communication module 260 of the electronic device 101, and up convert the received signal of the IF band into an RF band, and transmit the up-converted signal to the external device or the base station via antennas.

In accordance with an embodiment, the first communication circuit 211, the second communication circuit 221, the third communication circuit 231, or the fourth communication circuit 241 may include a plurality of constructions, for the sake of frequency conversion between an RF band and an IF band. For example, the first communication circuit 211, the second communication circuit 221, the third communication circuit 231, or the fourth communication circuit 241 may include at least one of a low noise amplifier (LNA), a power amplifier (PA), a phase shifter (PS), a divider, an up/down converter, and a filter.

In accordance with another embodiment, the communication circuit (e.g., the first communication circuit 211, the second communication circuit 221, the third communication circuit 231, or the fourth communication circuit 241) may be arranged in the communication device (e.g., the first communication device 210, the second communication device 220, the third communication device 230, or the fourth communication device 240). For example, the first communication circuit 211 may be arranged in the first communication device 210, and the second communication circuit 221 may be arranged in the second communication device 220. For example, the first communication device 210 may include a separate PCB distinct from the main PCB 250. The first communication circuit 211 may be arranged on the separate PCB included in the first communication device 210.

In accordance with various embodiments, it is illustrated that the first communication circuit 211, the second communication circuit 221, the third communication circuit 231, or the fourth communication circuit 241 is arranged in each corner of the electronic device 101, but an embodiment is not limited to this. The first communication circuit 211, the second communication circuit 221, the third communication circuit 231, or the fourth communication circuit 241 may be arranged as various numbers in various positions of an internal region of the electronic device 101. According to an embodiment, at least two of the first communication circuit 211, the second communication circuit 221, the third communication circuit 231, or the fourth communication circuit 241 may be operated concurrently by means of a switching device (not shown). In order to convert a direction of a transmission beam or a reception beam at beamforming, the electronic device 101 may form a beam in a direction corresponding to an optimal wireless channel by using at least two or more communication circuits.

In accordance with another embodiment, the electronic device 101 may perform an omni-directional communication or a directional communication by using one communication circuit among the first communication circuit 211, the second communication circuit 221, the third communication circuit 231, or the fourth communication circuit 241. For example, even when performing the directional communication, that is, a communication which uses beamforming, the electronic device 101 may use only one communication circuit among the first communication circuit 211 to the fourth communication circuit 241 as well. In order to convert a direction of a transmission beam or a reception beam, the electronic device 101 may perform beam sweeping or beam training for a direction corresponding to an optimal wireless channel, by continuously switching one communication circuit corresponding to a direction intended to be converted.

In accordance with various embodiments, at least one communication circuit among the first communication circuit 211, the second communication circuit 221, the third communication circuit 231, or the fourth communication circuit 241 may be selectively ON or OFF on the basis of context information obtained by a sensor. For example, the sensor module 176 may include a grip sensor (not shown), and the electronic device 101 may sense a grip of the electronic device 101 by the grip sensor (not shown), and control a switching device (not shown) to activate a communication circuit (e.g., the first communication circuit 211) arranged in a position for avoiding this grip.

In accordance with various embodiments, the communication module 260 may receive a baseband signal from the processor 270, and up convert the received baseband signal into an IF signal of an intermediate frequency band, and transmit the up converted IF signal to at least one communication circuit among the first communication circuit 211, the second communication circuit 221, the third communication circuit 231, or the fourth communication circuit 241. For another example, the communication module 260 may receive an IF signal of an intermediate frequency band from at least one communication circuit among the first communication circuit 211, the second communication circuit 221, the third communication circuit 231, or the fourth communication circuit 241, and down convert the received IF signal of the intermediate frequency band into a baseband signal, and transmit the down converted signal to the processor 270. The communication module 260 may include a plurality of constructions, for the sake of frequency conversion between an IF band and a baseband. For example, the communication module 260 may include at least one of a filter, a divider, a single pole double through (SPDT) switch, an up/down converter, a mixer, a transmit analog baseband (TXABB), or a receive analog baseband (RXABB).

In various embodiments, the communication module 260 may include a plurality of transmission and/or reception stream circuits (e.g., a first transmission and/or reception stream circuit 401 and a second transmission and/or reception stream circuit 403). Each of the first transmission and/or reception stream circuit 401 and the second transmission and/or reception stream circuit 403 may include the filter, the divider, the switch, the up/down converter, the mixer, the TXABB, or the RXABB, independently. The electronic device 101 may perform transmission diversity or reception diversity by using the first transmission and/or reception stream circuit 401 and the second transmission and/or reception circuit 403.

In accordance with various embodiments, the communication module 260 may be connected with at least one of the first communication circuit 211, the second communication circuit 221, the third communication circuit 231, or the fourth communication circuit 241. For example, at least one of the first communication circuit 211, the second communication circuit 221, the third communication circuit 231, or the fourth communication circuit 241 may be each electrically connected with the communication module 260 via a first connection member 281, a second connection member 282, a third connection member 283, or a fourth connection member 284. The first connection member 281, the second connection member 282, the third connection member 283, or the fourth connection member 284 may include a coaxial cable or a flexible PCB (FPCB). The first connection member 281, the second connection member 282, the third connection member 283, or the fourth connection member 284 may, for example, electrically connect the main PCB 250 with the first communication device 210, the second communication device 220, the third communication device 230, or the fourth communication device 240, in which the first communication circuit 211, the second communication circuit 221, the third communication circuit 231, or the fourth communication circuit 241 is arranged. The first connection member 281, the second connection member 282, the third connection member 283, or the fourth connection member 284 and the main PCB 250 are electrically connected, whereby the first communication circuit 211, the second communication circuit 221, the third communication circuit 231, or the fourth communication circuit 241 may transmit a signal to the communication module 260 arranged on the main PCB 250 or receive a signal from the communication module 260. In accordance with various embodiments, the connection member may include all machineries of the same or similar meaning such as an interface, a connection circuit, etc.

In various embodiments, the communication module 260 may include a fifth communication circuit (e.g., a fifth communication circuit 400 of FIG. 4) which has been electrically connected with the first communication circuit 211 to the fourth communication circuit 241. The communication module 260 may include a communication processor (CP). In various embodiments, the communication processor may include a wireless modem (e.g., a wireless modem 570 of FIG. 5). For another example, the processor 270 may include an application processor (AP).

Figure 3:
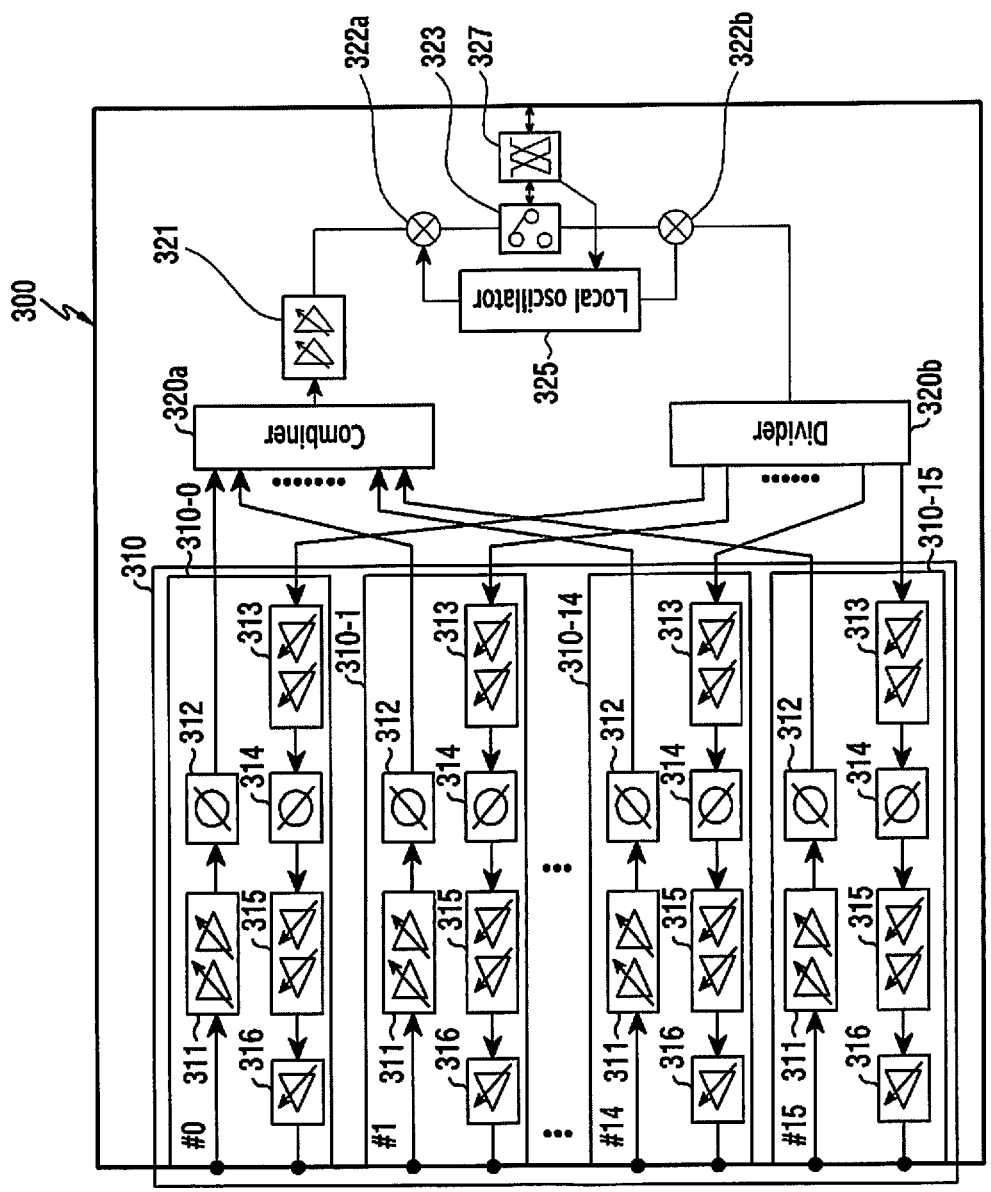
FIG. 3 illustrates a circuit showing a detailed construction of a communication circuit in an electronic device according to various embodiments of the present disclosure.

FIG. 3 illustrates a circuit showing a detailed construction of a communication circuit according to various embodiments of the present disclosure.

Referring to FIG. 3, the communication circuit 300 (e.g., the first communication circuit 211, the second communication circuit 221, the third communication circuit 231, or the fourth communication circuit 241) of various embodiments of the present disclosure may include at least one of a transmission and/or reception circuit 310, a combiner 320*a*, a divider 320*b*, an RBDA 321, a reception mixer 322*a*, a transmission mixer 322*b*, a transmission and/or reception conversion switch 323, a local oscillator 325, a signal divider 327, and a controller (not shown). The transmission and/or reception circuit 310 may include a plurality of transmission and/or reception sub circuits. For example, the transmission and/or reception circuit 310 may include a first transmission and/or reception sub circuit 310-0 to a sixteenth transmission and/or reception sub circuit 310-15.

In accordance with various embodiments, at least one of the first transmission and/or reception sub circuit 310-0 to the sixteenth transmission and/or reception sub circuit 310-15 may be connected to at least one antenna. For example, a plurality of antennas connected with the first transmission and/or reception sub circuit 310-0 to the sixteenth transmission and/or reception sub circuit 310-15 may form one antenna array. In accordance with an embodiment, the first transmission and/or reception sub circuit 310-0 to the sixteenth transmission and/or reception sub circuit 310-15 may include at least one of a low noise amplifier (LNA) 311, a phase shifter (PS) 312, a phase shifter drive amplifier (PSDA) 313, a PS 314, a pre power amplifier (PPA) 315, or a power amplifier (PA) 316.

In accordance with various embodiments, the communication circuit 300 may convert an RF signal of a millimeter wave band received via a plurality of antennas (e.g., the antenna module 197 of FIG. 1) into an IF signal of an intermediate frequency band, and forward the IF signal to an RF stage (e.g., the communication module 190, or the wireless communication module 192, of FIG. 1) of a next stage. By doing so, the communication circuit 300 may receive the signal from an external device (e.g., the electronic device 102) or a base station. For another example, the communication circuit 300 may convert an IF signal of an intermediate frequency band inputted at the RF stage (e.g., the communication module 190, or the wireless communication module 192, of FIG. 1) into an RF signal of a millimeter wave band and thereafter, forward the RF signal to an array antenna (e.g., the antenna module 197 of FIG. 1) via at least one of the first transmission and/or reception sub circuit 310-0 to the sixteenth transmission and/or reception sub circuit 310-15. By doing so, the communication circuit 300 may transmit the signal to the external device or the base station.

In accordance with various embodiments, the first transmission and/or reception sub circuit 310-0 to the sixteenth transmission and/or reception sub circuit 310-15 each may have a transmit (Tx) path and a receive (Rx) path for transmitting and/or receiving an ultra-high frequency wireless signal in a time division multiple access (TDAM) scheme. For example, the Tx path may include at least one of the PSDA 313, the PS 314, the PPA 315, or the PA 316. The Rx path may include at least one of the LNA 311 or the PS 312.

In accordance with various embodiments, the LNA 311 may amplify a signal which has been received via the plurality of antennas. The LNA 311 may be arranged in a next stage of the plurality of antennas, in order to minimize the attenuation of a signal on a transmission line. By amplifying the received signal wherein the signal satisfies a minimal noise factor, the LNA 311 may improve the entire system noise performance.

The PS 312 may receive a signal amplified through the LNA 311, and adjust a phase of the received signal. For example, in a 4-bit construction, the PS 312 may vary a phase of 0 to 360 degrees at intervals of 22.5 degrees in a total of sixteen states. In accordance with an embodiment, each PS 312 included in the transmission and/or reception sub circuits 310-0 to 310-15 may present a phase variation of a set value according to reception beamforming. For example, to convert a direction of a reception beam, the processor 270 may transmit a control signal instructing a phase variation to a PS of a signal processing circuit connected to each antenna.

The PSDA 313, an example of a driving amplifier, may be positioned in a transmission RF chain path of a multi-chain RF system for a phased array system. The PSDA 313 may perform a function of amplification for compensating for a low gain of the PA 316, a loss caused by a power divider positioned in front/rear, and a loss caused by the phase shifter (PS).

The PS 314 may perform a function of varying a phase of a received signal. For example, in a 4-bit construction, the PS 314 may vary a phase of 0 to 360 degrees at intervals of 22.5 degrees in a total of sixteen states. In accordance with an embodiment, each PS 314 included in the transmission and/or reception sub circuits 310-0 to 310-15 may present a phase variation of a set value, in order to perform transmission beamforming. For example, to convert a direction of a transmission beam, the processor 270 may transmit a control signal instructing a phase variation to the PS 314 of the transmission and/or reception sub circuits 310-0 to 310-15 connected to the antennas.

The PPA 315 may be positioned in a front stage of the PA 316, and include an amplifier for varying an intensity of a signal presented to the PA 316. The PA 316 may include an amplifier which is positioned at a transmitter end stage, to amplify an RF signal, and minimizes a distortion of an output signal and maintains a high efficiency characteristic. In accordance with various embodiments, a power level obtaining circuit, such as a transmitter signal strength indicator (TSSI), may be embedded in an end stage of the PA 316.

In accordance with various embodiments, at least one of the first transmission and/or reception sub circuit 310-0 to the sixteenth transmission and/or reception sub circuit 310-15 may be connected to at least one antenna which forms an array antenna. The antenna connected to the transmission and/or reception circuit 310 may be, for instance, a radiation element array (i.e., a 4×4 radiation element array) antenna which includes sixteen radiation elements. In accordance with an embodiment, the array antenna may include a plurality of dipole antennas and a plurality of patch antennas. In accordance with an embodiment, the first transmission and/or reception sub circuit 310-0 to the sixteenth transmission and/or reception sub circuit 310-15 may be arranged in one surface of a printed circuitry board, and the plurality of dipole antennas and the plurality of patch antennas may be positioned in the other surface of the printed circuitry board.

In accordance with various embodiments, the transmission and/or reception circuit 310 (e.g., the first transmission and/or reception sub circuit 310-0 to the sixteenth transmission and/or reception sub circuit 310-15) may be a number corresponding to the number of the plurality of antennas, for example, sixteen corresponding to sixteen array antennas, respectively, in order to process a transmitted signal and/or received signal for each antenna. In accordance with various embodiments, the combiner 320a may be implemented as, for example, a 16-way combiner/divider, and the 16-way combiner/divider may combine signals which have been received via each receive path of the first transmission and/or reception sub circuit 310-0 to the sixteenth transmission and/or reception sub circuit 310-15, into one received signal, and may be included between the first transmission and/or reception sub circuit 310-0 to sixteen transmission and/or reception sub circuit 310-15 and the transmission and/or reception conversion switch 323. In accordance with various embodiments, the divider 320b may be implemented as, for example, a 16-way combiner/divider, and the 16-way combiner/divider may divide one transmitted signal into a plurality of transmitted signals according to each transmit path of the first transmission and/or reception sub circuit 310-0 to the sixteen transmission and/or reception sub circuit 310-15, and may be included between the first transmission and/or reception sub circuit 310-0 to sixteen transmission and/or reception sub circuit 310-15 and the transmission and/or reception conversion switch 323.

In accordance with various embodiments, the transmission and/or reception circuit 310 (e.g., the first transmission and/or reception sub circuit 310-0 to the sixteenth transmission and/or reception circuit 310-15) may include the PA 316 for amplifying a transmitted signal, the PS 314 for varying a phase of the transmitted signal for the sake of transmission beamforming, the LNA 311 for amplifying a received signal, or the PS 312 varying a phase of the received signal for the sake of reception beamforming.

In accordance with various embodiments, a construction, and an installation position, of an amplification stage for amplifying a transmitted signal and a received signal in the communication circuit 300 (e.g., the first communication circuit 211 to the fourth communication circuit 241) may be various. In accordance with various embodiments, the communication circuit 300 may further include a filter for filtering each of a transmitted signal and a received signal, etc.

In accordance with various embodiments, the communication circuit 300 (e.g., the first communication circuit 211 to the fourth communication circuit 241) may include a frequency up/down converter for up converting a transmitted signal (for example, an IF signal) transmitted from the communication module 260 into a wireless signal (for example, an RF signal) of an ultra-high frequency band, or frequency-down converting a received signal of an ultra-high frequency band into an IF signal. For example, the frequency up/down converter may include a local oscillator 325, a reception mixer 322a, or a transmission mixer 322b, etc. According to various embodiments, when being formed to provide and transmit a signal of an ultra-high frequency band for wireless transmission in the communication module 260, the communication circuit 300 may not include the frequency up/down converter.

According to various embodiments, the local oscillator 325 may be formed to provide a local signal in itself, but may be formed to provide a local signal by using (for example, frequency-multiplying) a reference local signal transmitted from the communication module 260 for the sake of signal synchronization. For example, an IF signal may be 11.x GHz (e.g., 11.2 GHz), and the reference local signal may be 5.x GHz (e.g., 5.6 GHz), and the local oscillator 325 may provide a local signal (e.g., 16.8 GHz) which has three-multiple multiplied the reference local signal, to provide a wirelessly transmitted ultra-high frequency signal (e.g., 28 GHz). For example, in response to up converting an IF signal into an RF signal, the provided signal may correspond to a frequency (e.g., 16.8 GHz) which has three-multiple multiplied a reference frequency (e.g., 5.6 GHz). By transmitting the provided signal to the transmission mixer 322b, the local oscillator 325 may up convert a frequency (e.g., 11.2 GHz) of the IF signal. A frequency of the frequency-up converted RF signal may be 28 GHz which is a sum of the frequency of the IF signal and the three-multiple multiplied frequency. For another example, by presenting the reference local signal or a local signal having frequency-multiplied the reference local signal to the reception mixer 322a, the local oscillator 325 may provide the IF signal of the intermediate frequency band from an RF signal of an ultra-high frequency band. The reference local signal may be, for example, a signal corresponding to a frequency band of 4 GHz to 8 GHz. The IF signal may be, for example, a signal corresponding to a frequency band of 8 GHz to 14 GHz. The RF signal may be, for example, a signal corresponding to a frequency band of 20 GHz to 60 GHz.

According to various embodiments, the communication circuit 300 may include a controller (not shown) for controlling an operation of the communication circuit 300. The controller (not shown) may perform a transmission and/or reception switching control and a transmission and/or reception beamforming control, for the communication circuit 300. In accordance with various embodiments, the controller (not shown) may be formed to receive a control signal from the processor 270.

According to various embodiments, a signal presented from the transmitter and/or receiver to the communication circuit 300 may include an IF signal, a reference local signal, and a control signal. For example, the IF signal, the reference local signal, and the control signal each may be signals transmitted on different frequency bands. The IF signal, the reference local signal, and the control signal may be presented as frequency signals which have been combined through the connection member (e.g., a coaxial cable or an FPCB). In accordance with an embodiment, the communication circuit 300 may include the signal divider 327 of a filter combiner/divider structure, and the signal divider 327 may divide a frequency-combined signal presented from the communication module 260, into each IF signal, reference local signal, and control signal. For example, in response to the IF signal being 11.2 GHz, and the reference local signal being 5.6 GHz, the control signal may be designed as 2 GHz or less. The signal divider 327 may include, for example, a triplexer for frequency dividing/combining an IF signal, a reference local signal, and a control signal, and may be formed including a plurality of filters (for instance, a low pass filter, a high pass filter, a band-pass filter, etc.) as well.

Figure 4:
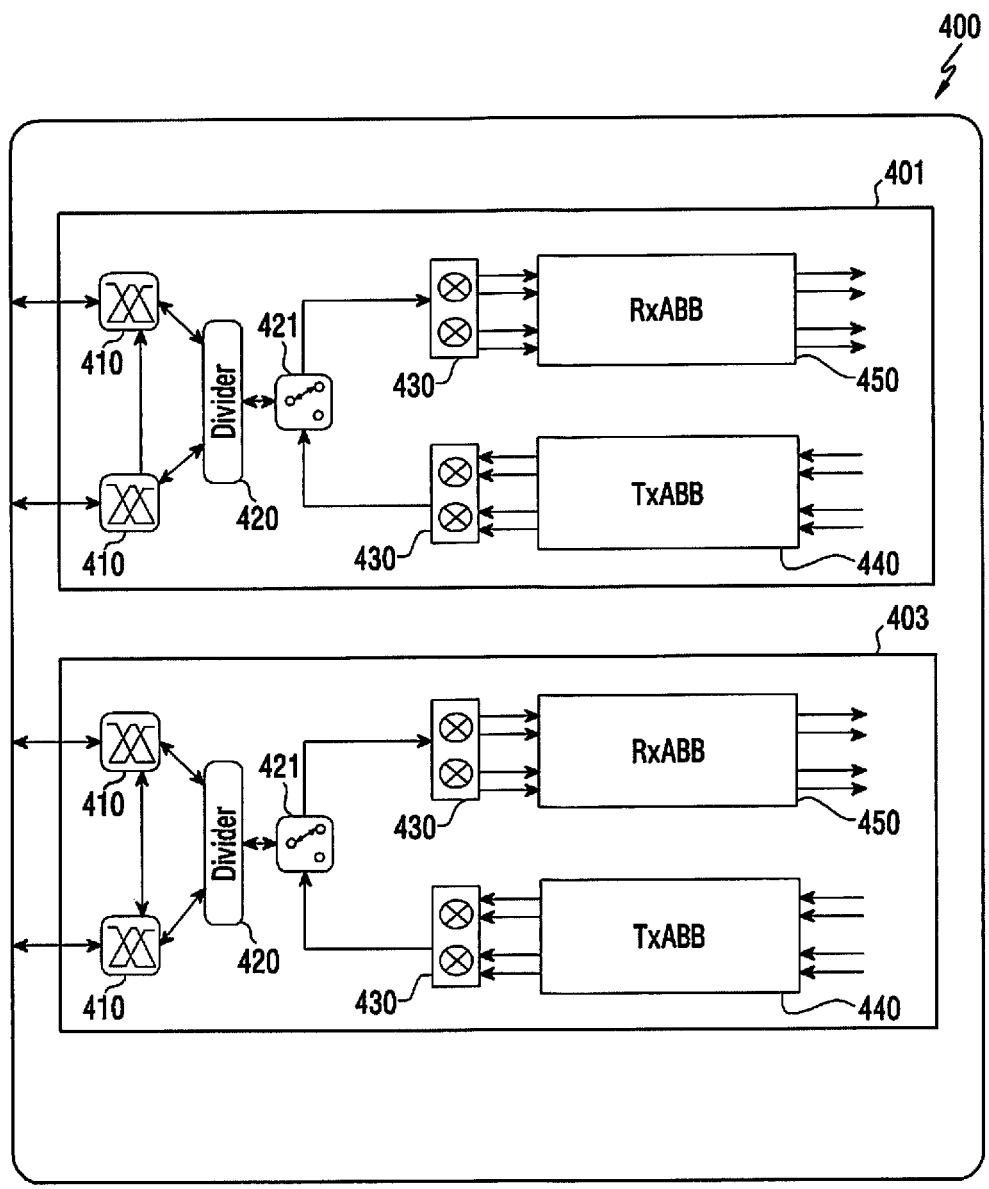
FIG. 4 illustrates a circuit showing a detailed construction of a communication module in an electronic device according to various embodiments of the present disclosure.

FIG. 4 illustrates a circuit showing a detailed construction of the fifth communication circuit 400 according to various embodiments of the present disclosure.

Referring to FIG. 4, the fifth communication circuit 400 of various embodiments of the present disclosure may include at least one of a filter 410, a divider 420, a transmission and/or reception conversion switch 421, a local oscillator 430, a TXABB 440, and an RXABB 450.

In accordance with various embodiments, the fifth communication circuit 400 may be denoted by various terms such as an intermediate frequency integrated circuit (IFIC), a source wireless frequency circuit, or a source RF circuit. In various embodiments, the fifth communication circuit 400 may be included in the communication module 260 illustrated in FIG. 2. For example, the fifth communication circuit 400 may be connected with the first communication circuit 211 to the fourth communication circuit 241, respectively. The connection may be formed through the connection member, and the connection member may include a coaxial cable or an FPCB. For example, referring to FIG. 2, the fifth communication circuit 400 may be electrically connected with the first communication circuit 211 to the fourth communication circuit 241, via the first connection member 281 to the fourth connection member 284, respectively.

In accordance with various embodiments, the filter 410 may provide one signal which includes all of an IF signal on an intermediate frequency band (e.g., 11 GHz), a local oscillator (OS) signal (e.g., 5.5 GHz) provided by the local oscillator 430, and a control signal (e.g., 2 GHz) on a baseband.

In accordance with various embodiments, the divider 420 may combine one signal received from the communication circuits (e.g., the first communication circuit 211, the second communication circuit 221, the third communication circuit 231, or the fourth communication circuit 241) included in the communication device, to paths of the two same signals, or divide one signal received from the processor 270 into the two same signals. For example, the divider 420 may implement transmission diversity, by receiving a signal from the processor 270, dividing the signal into the two same signals, and transmitting the signal to two communication circuits (e.g., the first communication circuit 211 or the third communication circuit 231). For another example, the divider 420 may implement reception diversity, by combining signals received from two mutually different communication circuits (e.g., the first communication circuit 211 or the third communication circuit 231) into one signal. In accordance with an embodiment, the divider 420 may be implemented as a 2-way combiner/divider for dividing a signal to two paths which include a transmissions path and a receive path.

In accordance with various embodiments, the transmission and/or reception conversion switch 421 may forward a signal to the divider 420, or receive a signal from the divider 420. For example, in response to transmitting a signal, the transmission and/or reception conversion switch 421 may transmit the signal forwarded from the TXABB 440, to the divider 420, thereby forwarding the transmitted signal to at least one communication device. For another example, in response to receiving a signal, the transmission and/or reception conversion switch 421 may receive a signal from the divider 420 and transmit the signal to the RXABB 450, thereby forwarding the received signal to the processor 270.

In accordance with various embodiments, the local oscillator 430 may provide a signal corresponding to a reference frequency for frequency up/down conversion between an IF signal and a baseband signal. The provided signal may be used for frequency conversion through a transmission mixer (e.g., the transmission mixer 322b of FIG. 3) or a reception mixer (e.g., the reception mixer 322a of FIG. 3). For example, the local oscillator 430 may provide an IF signal of the intermediate frequency band from a baseband frequency, by presenting the reference local signal or a local signal having frequency-multiplied the reference local signal to the transmission mixer. For another example, the local oscillator 430 may provide the baseband signal from an IF signal of an intermediate frequency band, by presenting the reference local signal or a local signal having frequency-multiplied the reference local signal to the reception mixer.

In accordance with various embodiments, the transmit analog baseband (TXABB) 440 may receive a signal from the processor 270, and transmit the signal to an up converter. The TXABB 440 may receive a digital to analog conversion (DAC) signal from the processor 270. The DAC signal may correspond to a signal which is formed when a digital signal presented from the processor 270 is converted into an analog signal, and the converted analog signal may correspond to a baseband frequency. In accordance with an embodiment, the TXABB 440 may further include a flexible low pass filter (LPF), or a programmable gain controlled amplifier.

In accordance with various embodiments, the receive analog baseband (RXABB) 450 may receive an output signal whose frequency band is down converted, and transmit the received signal to the processor 270. The RXABB 450 may transmit the down-converted output signal to an analog to digital conversion (ADC). The down-converted output signal may correspond to a signal which has a frequency of 5.5 GHz corresponding to a difference value between a frequency band (e.g., 11 GHz) corresponding to the IF signal and the LO signal (e.g., 5.5 GHz). In accordance with an embodiment, the RXABB may further include a flexible LPF, or a programmable gain controlled amplifier.

Figure 5A:
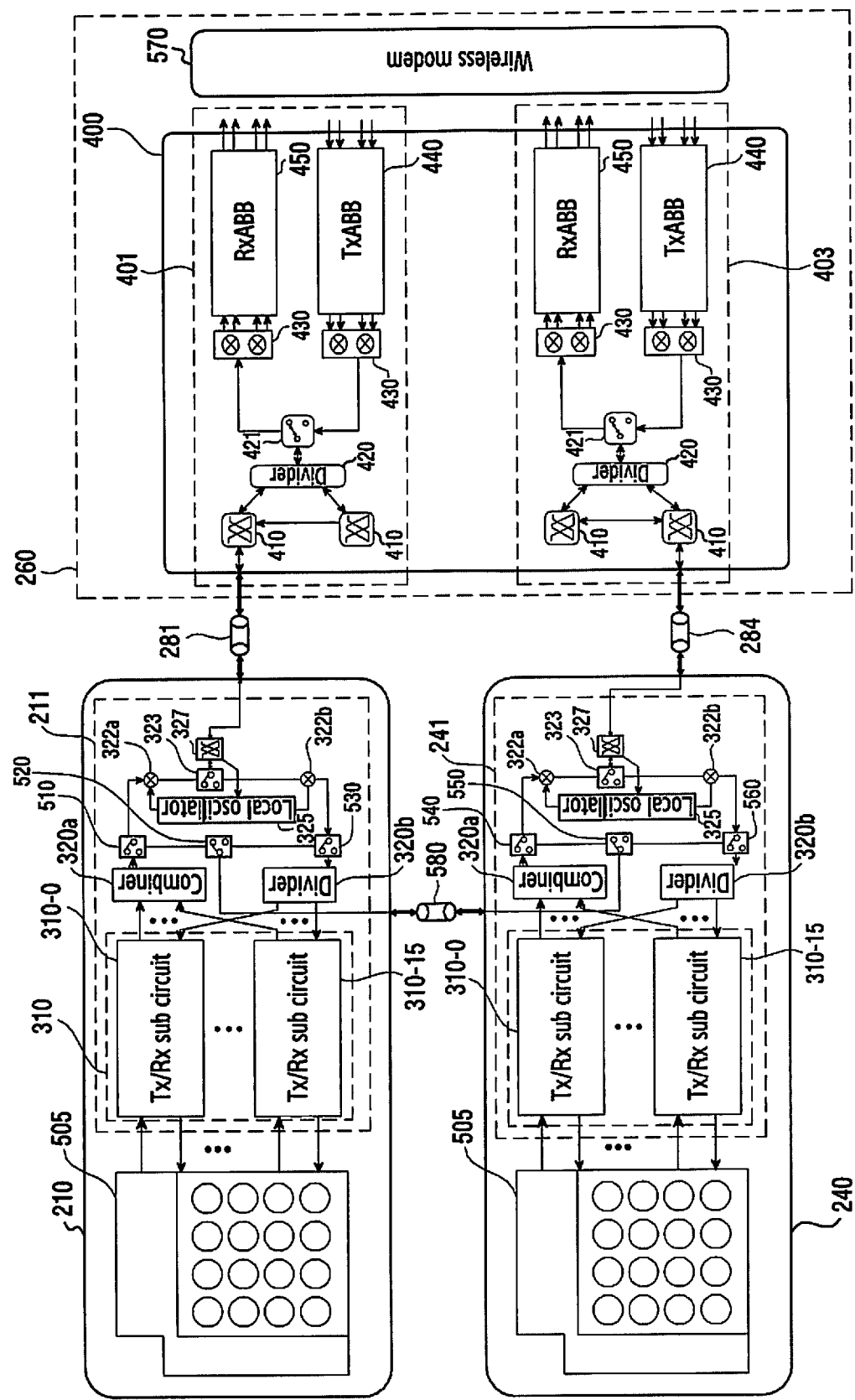
FIG. 5A illustrates a circuit for performing calibration in an electronic device according to various embodiments of the present disclosure.

FIG. 5A illustrates a circuit for performing calibration in an electronic device according to various embodiments of the present disclosure.

Referring to FIG. 5A, the first communication device 210 may include the first communication circuit 211 and an antenna module 505, and the first communication circuit 211 may further include a first switch 510, a second switch 520, and a third switch 530. The fourth communication device 240 may include the fourth communication circuit 241 and an antenna module 505, and the fourth communication circuit 241 may further include a fourth switch 540, a fifth switch 550, and a sixth switch 560. The first communication device 210 and the fourth communication device 240 may correspond to the first communication device 210 and the fourth communication device 240 illustrated in FIG. 2. The first communication circuit 211 and the fourth communication circuit 241 may correspond to the first communication circuit 211 and the fourth communication circuit 241 illustrated in FIG. 2.

The communication module 260 illustrated in FIG. 5A may correspond to the communication module 260 illustrated in FIG. 2. The communication module 260 may include the fifth communication circuit 400 and the wireless modem 570.

In accordance with various embodiments, the fifth communication circuit 400 may provide a test signal for performing calibration. For example, the fifth communication circuit 400 may receive a control signal instructing the execution of calibration from the wireless modem 570. In response to the reception of the control signal, the fifth communication circuit 400 may provide a test signal corresponding to an intermediate frequency (IF) band. In accordance with an embodiment, the wireless modem 570 may determine to perform calibration on the basis of an internal parameter value. For example, in response to the internal parameter value not being included in a value of a defined range, the wireless modem 570 may provide a test signal. In accordance with an embodiment, the fifth communication circuit 400 may transmit the test signal to the first communication circuit 211 corresponding to a transmit path among a loopback path. The test signal may be transmitted from the fifth communication circuit 400 to the first communication device 210 via the first connection member 281 for electrical connection between the fifth communication circuit 400 and the first communication device 210. The first connection member 281 may correspond to the first connection member 281 illustrated in FIG. 2. In accordance with an embodiment, the wireless modem 570 may transmit a control signal instructing the control of a switch for change of a path of the test signal, to the first switch 510, the second switch 520, and the third switch 530.

In accordance with various embodiments, the first switch 510 may be arranged in a next stage of the combiner 320a, in a receive path of the first communication circuit 211. In accordance with various embodiments, the first switch 510 may change a state from a state (below, a first state) for receiving a control signal from the wireless modem 570, and receiving, on the basis of the control signal, a signal from an external device (e.g., the electronic device 102 or the server 108), to a state (below, a second state) for performing calibration of the electronic device 101. For example, in response to the first switch 510 corresponding to the first state, the first switch 510 may not present electrical connection with the second switch 520. For instance, the first switch 510 may transmit a signal which is transmitted from the external device and is amplified by the transmission and/or reception sub circuits 310-0 to 310-15 and is combined by the combiner 320a, to the reception mixer 322a. For another example, in response to the first switch 510 corresponding to the second state, the first switch 510 may present electrical connection with the second switch 520. For instance, the first switch 510 may receive a test signal from the second switch 520, and transmit this to the reception mixer 322a. The test signal received from the second switch 520 may correspond to a test signal received from another communication circuit (e.g., the second communication circuit 221, the third communication circuit 231, and the fourth communication circuit 241).

In accordance with various embodiments, the second switch 520 may present electrical connection between the first communication circuit 211 and the fourth communication circuit 241. By presenting the electrical connection with the fifth switch 550 of the fourth communication circuit 241, the second switch 520 may transmit the test signal to the fourth communication circuit 241, or receive the test signal from the fourth communication circuit 241. In accordance with an embodiment, the second switch 520 may present electrical connection with the first switch 510 or the third switch 530. For example, in response to the first communication circuit 211 being a communication circuit which corresponds to a receive path of the test signal, the second switch 520 may receive the test signal from the fifth switch 550, and transmit the received test signal to the first switch 510. By receiving the test signal and transmitting the received test signal to the reception mixer 322a, the first switch 510 may forward the test signal to the fifth communication circuit 400. For another example, in response to the first communication circuit 211 being a communication circuit which corresponds to a transmit path, the second switch 520 may receive a test signal from the third switch 530, and transmit the received test signal to the fifth switch 550.

In accordance with various embodiments, the third switch 530 may be arranged on a transmit path of the first communication circuit 211. For example, the third switch 530 may be arranged in a next stage of the transmission mixer 322b, and be arranged in a previous stage of the divider 320b. In accordance with various embodiments, the third switch 530 may change a state from a state (below, a second state) for receiving a control signal from the wireless modem 570, and receiving, on the basis of the control signal, a signal to an external device (e.g., the electronic device 102 or the server 108), to a state (below, a second state) for performing calibration of the electronic device 101. For example, in response to the third switch 530 corresponding to the second state, the third switch 530 may not present electrical connection with the second switch 520. For instance, to transmit a signal to the external device, the third switch 530 may receive the signal from the fifth communication circuit 400, and transmit the received signal to the divider 320b.

For another example, in response to the third switch 530 corresponding to the second state, the third switch 530 may present electrical connection with the second switch 520. For instance, the third switch 530 may transmit the test signal, which has been received from the fifth communication circuit 400 via the first connection member 281, to the second switch 520.

Figure 5B:
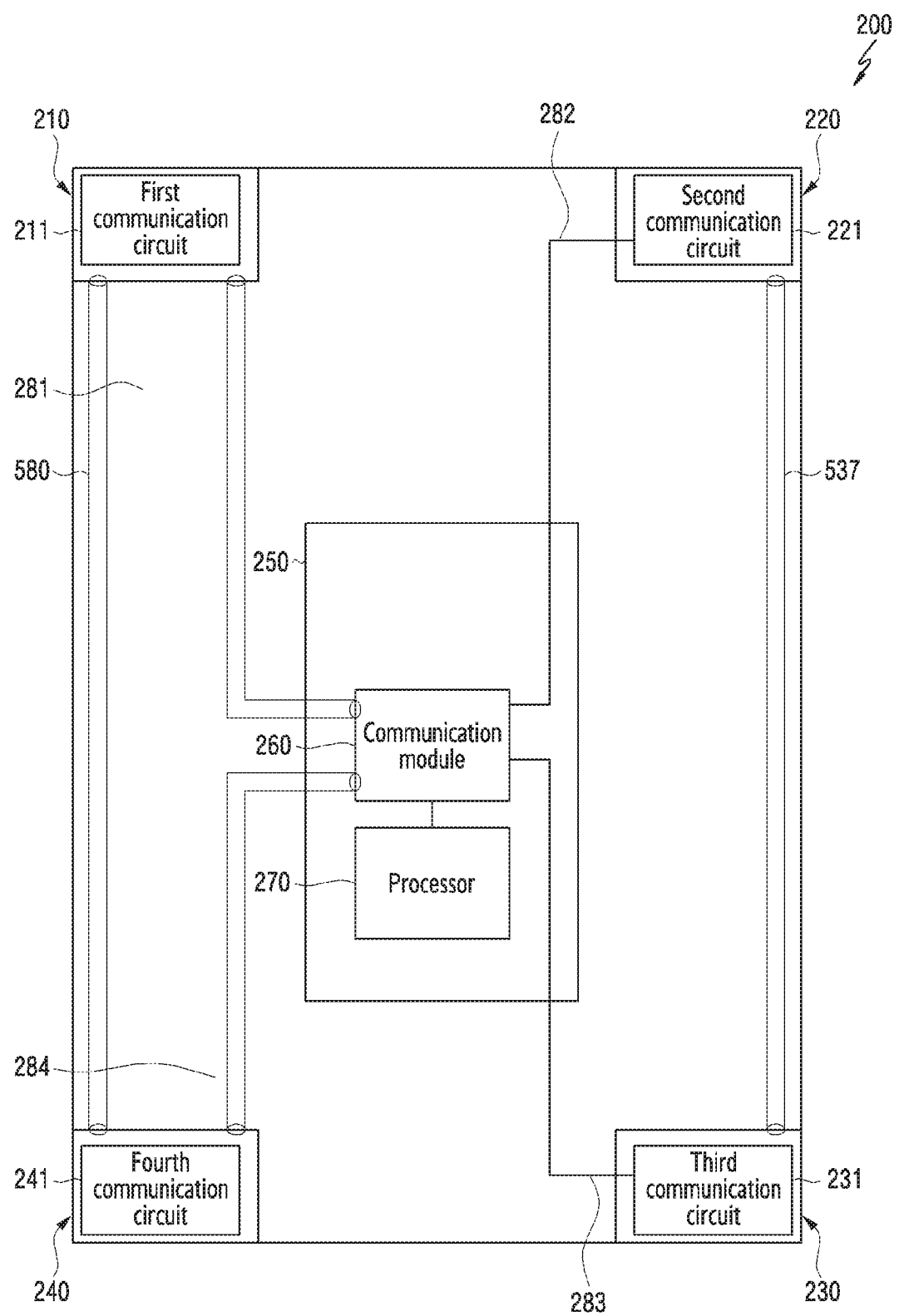
FIG. 5B illustrates an arrangement relationship of a communication device for performing calibration in an electronic device according to various embodiments of the present disclosure.

In accordance with various embodiments, referring to FIG. 5B, the first connection member 281 may present electrical connection between the first communication device 210 and the fifth communication circuit 400. A fifth connection member 580 may present electrical connection between the first communication device 210 and the fourth communication device 240. The fourth connection member 284 may present electrical connection between the fourth communication device 240 and the fifth communication circuit 400. The fourth connection member 284 may correspond to the fourth connection member 284 illustrated in FIG. 2.

For further example, a sixth connection member 537 may electrically connect the second communication circuit 221 and the third communication circuit 231. The first connection member 281, the fifth connection member 580, the fourth connection member 284, or the sixth connection member 537 may include, for example, a coaxial cable or an FPCB.

Figure 5C:
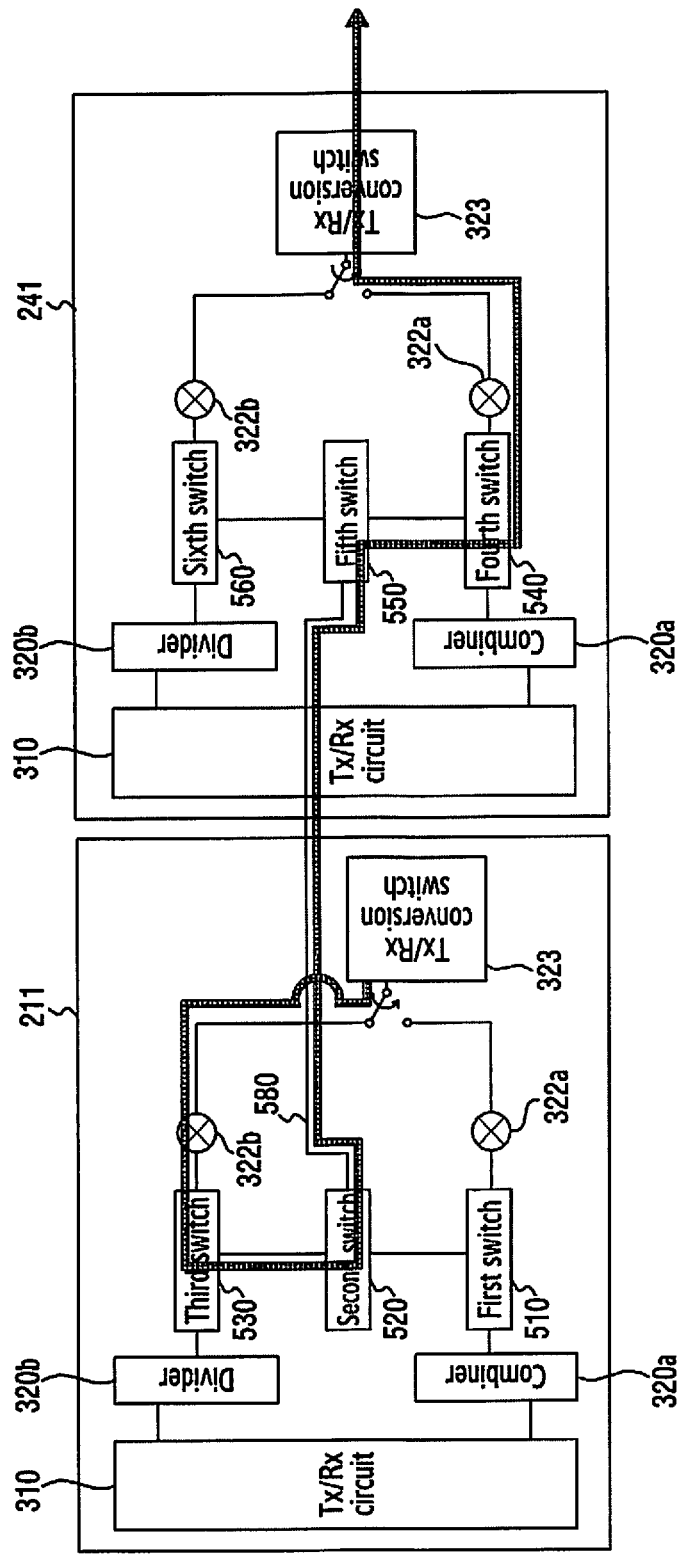
FIG. 5C illustrates a flow of a test signal, at calibration execution in an electronic device according to various embodiments of the present disclosure.

FIG. 5C illustrates a flow of a test signal at calibration execution in an electronic device according to various embodiments of the present disclosure. The first communication circuit 211 illustrated in FIG. 5C may correspond to the communication circuit 211 to 241 illustrated in FIG. 2, and/or the communication circuit 300 illustrated in FIG. 3.

Referring to FIG. 5C, the first communication circuit 211 may receive a test signal for calibration from the fifth communication circuit 400. The first communication circuit 211 may receive a test signal from the fifth communication circuit 400, through electrical connection with the fifth communication circuit 400 presented by the first connection member 281. The test signal may be forwarded to the transmission mixer 322b corresponding to a transmit path of the first communication circuit 211 via the transmission and/or reception conversion switch 323.

In accordance with an embodiment, the first communication circuit 211 may receive a control signal for switch control from the wireless modem 570. For example, the wireless modem 570 may determine a loopback path which will be calibrated, as a path including the first communication circuit 211 and the fourth communication circuit 241, and may determine the first communication circuit 211 as a communication circuit corresponding to a transmit path among the loopback path for performing the calibration. To provide electrical connection with the fourth communication circuit 241 corresponding to a receive path among the calibration loopback path, the first communication circuit 211 may receive a control signal instructing to change the third switch 530 and the second switch 520 into the second state, from the wireless modem 570. The second state may denote a state for providing the loopback path for calibration of the electronic device 101 by presenting electrical connection between the first communication circuit 211 and the fourth communication circuit 241. On the basis of the received control signal, the first communication circuit 211 may change the third switch 530 and the second switch 520 into the second state, and electrical connection may be presented between the third switch 530 and the second switch 520.

In accordance with an embodiment, the fourth communication circuit 241 may receive a control signal for switch control from the wireless modem 570. For example, the wireless modem 570 may determine the fourth communication circuit 241, as a communication circuit corresponding to a receive path of a calibration loopback path. To provide electrical connection with the first communication circuit 211 corresponding to the transmit path among the calibration loopback path, the fourth communication circuit 241 may receive a control signal instructing to change the fifth switch 550 and the fourth switch 540 into the second state, from the wireless modem 570. On the basis of the received control signal, the fourth communication circuit 241 may change the fifth switch 550 and the fourth switch 540 into the second state, and electrical connection may be presented between the fifth switch 550 and the fourth switch 540.

In accordance with an embodiment, the fifth connection member 580 may present electrical connection between the first communication circuit 211 and the fourth communication circuit 241. On the basis of the control signal, the second switch 520 of the first communication circuit 211 may be changed to the second state. On the basis of the control signal, the fifth switch 550 of the fourth communication circuit 241 may be changed to the second state. The second switch 520 and the fifth switch 550 are all changed to the second state, whereby the fifth connection member 580 may connect the second switch 520 and the fifth switch 550. Accordingly to this, the electrical connection between the first communication circuit 211 and the fourth communication circuit 241 may be presented. The test signal is transmitted from the second switch 520 to the fifth switch 550 via the fifth connection member 580, thereby being capable of being transmitted to the fourth communication circuit 241.

In accordance with various embodiments, the fourth communication circuit 241 may transmit the test signal to the fifth communication circuit 400. The fourth communication circuit 241 may receive the test signal via the fifth connection member 580 connected with the first communication circuit 211. The test signal may be forwarded from the fifth switch 550 to the fourth switch 540 on the basis of a state of the fourth switch 540. Thereafter, the test signal may be converted into an IF signal of an intermediate frequency band through the reception mixer 322a arranged on a receive path of the fourth communication circuit 241, and be transmitted to the fifth communication circuit 400. In accordance with the aforementioned various embodiments, calibration on the loopback path including the first communication circuit 211, the fourth communication circuit 241 and the fifth communication circuit 400 may be performed.

Figure 6A:
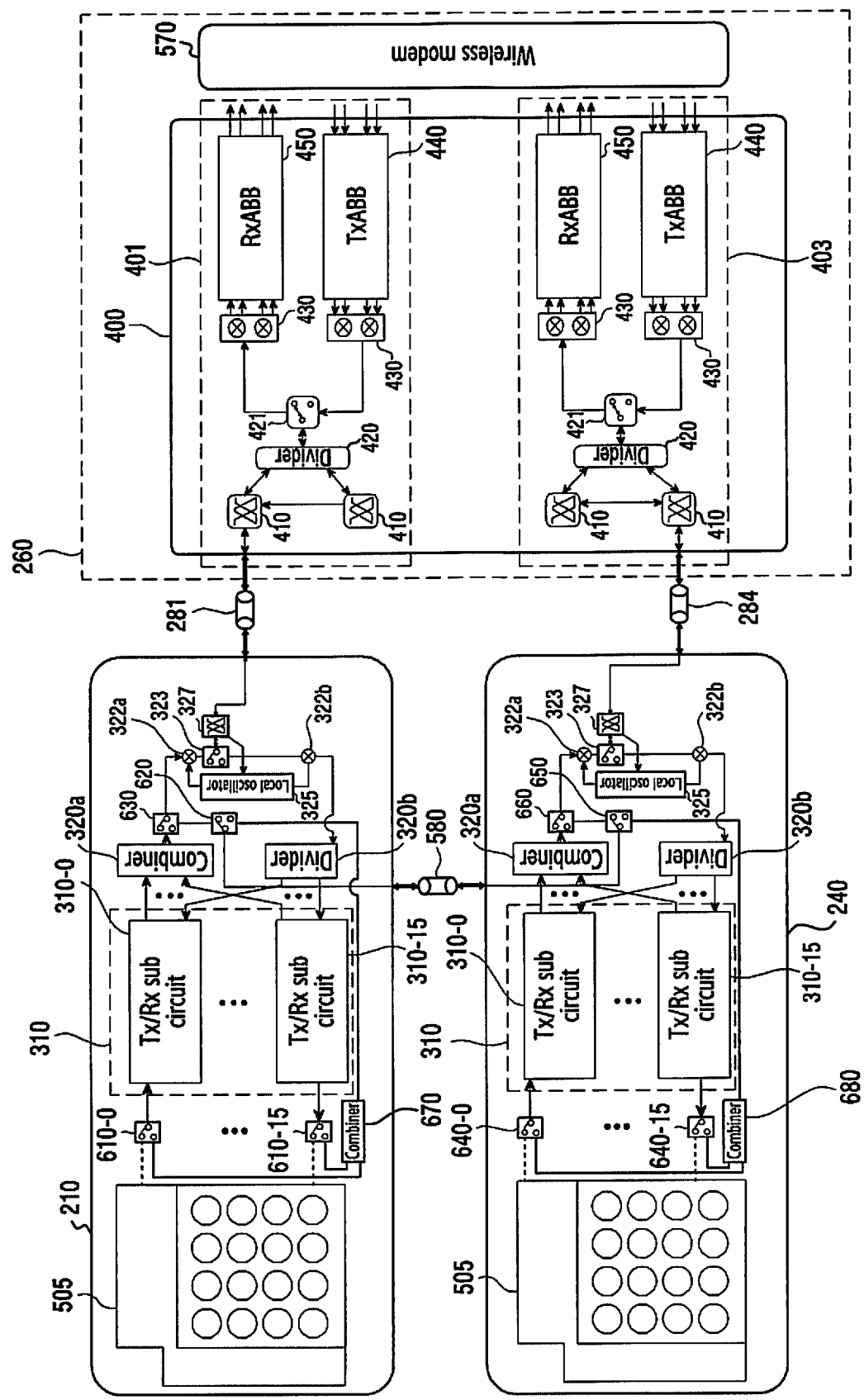
FIG. 6A illustrates a circuit for performing calibration in an electronic device according to various embodiments of the present disclosure.

FIG. 6A illustrates a circuit for performing calibration in an electronic device according to various embodiments of the present disclosure.

The first communication device 210 and the fourth communication device 240 illustrated in FIG. 6A may be at least in part similar with a communication device (e.g., the first communication device 210, the second communication device 220, the third communication device 230, or the fourth communication device 240) illustrated in FIG. 2, or include other embodiments. The communication module 260 illustrated in FIG. 6A may correspond to the communication module 260 illustrated in FIG. 5A.

Referring to FIG. 6A, the first communication device 210 may include a plurality of first switches 610-1 to 610-15, a second switch 620, a third switch 630, and a combiner 670. The fourth communication device 240 may include a plurality of fourth switches 640-1 to 640-15, a fifth switch 650, a sixth switch 660, and a combiner 680. The second switch 620 and the third switch 630 may be the same as or be similar with the second switch 520 and the third switch 530 illustrated in FIG. 5A. The fifth switch 650 and the sixth switch 660 may be the same as or be similar with the fifth switch 550 and the sixth switch 560 illustrated in FIG. 5A. Also, the plurality of fourth switches 640-0 to 640-15 may correspond to the plurality of first switches 610-0 to 610-15, and the combiner 680 may correspond to the combiner 670. Below, a description will be made for the plurality of first switches 610-0 to 610-15 and the combiner 670 which have been newly added.

In accordance with various embodiments, the first communication device 210 may include the plurality of first switches 610-0 to 610-15. The number of the plurality of first switches 610-0 to 610-15 may correspond to the number of the plurality of transmission and/or reception sub circuits (e.g., the first transmission and/or reception sub circuit 310-0 to the sixteenth transmission and/or reception sub circuit 310-15) included in the transmission and/or reception circuit 310. In accordance with an embodiment, the plurality of first switches 610-0 to 610-15 may be arranged in a next stage of the PA 316 corresponding to end stages of the plurality of transmission and/or reception sub circuits 310-0 to 310-15. Each of the plurality of first switches 610-0 to 610-15 may be arranged for each of the plurality of transmission and/or reception sub circuits 310-0 to 310-15 included in the transmission and/or reception circuit 310.

In accordance with an embodiment, the plurality of first switches 610-0 to 610-15 may receive a plurality of test signals, and transmit the received plurality of test signals to the combiner 670. In accordance with various embodiments, the plurality of first switches 610-0 to 610-15 may change a state of a switch from a state (below, a first state) for receiving a control signal from the wireless modem 570, and transmitting and/or receiving, on the basis of the received control signal, a signal with an external device (e.g., the electronic device 102 or the server 108), to a state (below, a second state) for performing calibration of the electronic device 101. The wireless modem 570 may determine the first communication device 210 as a communication device corresponding to a transmit path among a calibration loopback path. For instance, the fifth communication circuit 400 may transmit a test signal to the first communication circuit 211. The first communication device 210 may receive the test signal, and control the transmission and/or reception conversion switch 323 to transmit the test signal to the divider 320b. The first communication device 210 may divide one test signal into a plurality of test signals, through the divider 320b. The number of the plurality of test signals may correspond to the number of the plurality of transmission and/or reception sub circuits 310-0 to 310-15. Though not illustrated, the plurality of transmission and/or reception sub circuits 310-0 to 310-15 may, referring to FIG. 3, include the PSDA 313, the PS 314, the PPA 315, and the PA 316. The plurality of test signals may be amplified through the PSDA 313, the PS 314, the PPA 315, and the PA 316 arranged on a transmission RF chain. The amplified plurality of test signals may, after being amplified by the PA 316, be transmitted to the combiner 670 via the plurality of first switches 610-0 to 610-15 which have been changed into the second state on the basis of the control signal. The combiner 670 may receive the amplified plurality of test signals via the plurality of first switches 610-0 to 610-15, and combine the received signals into one signal. The combined signal may be transmitted to the fourth communication device 240 via the fifth connection member 580, on the basis of the second state of the second switch 620 and the fifth switch 650. The test signal transmitted to the fifth switch 650 of the fourth communication device 240 may be converted into an IF signal of an intermediate frequency band, by being transmitted to the reception mixer 322a via the sixth switch 660. The converted IF signal may be transmitted to the fifth communication circuit 400 arranged in a main PCB, via the fourth connection member 284 for connecting the fourth communication device 240 and the fifth communication circuit 400, and may be transmitted to the filter 410, and the divider 420, of the fifth communication circuit 400. The divider 420 may receive the amplified test signal and, by switching to the RXABB 450 in order to forward the amplified test signal to the wireless modem 570, the divider 420 may transmit the amplified test signal to the RXABB 450. By changing the test signal received from the divider 420 into a digital signal, the RXABB 450 may transmit the digital signal to the wireless modem 570.

In accordance with various embodiments, the wireless modem 570 may forward, by using the first connection member 281, a test signal for calibration to the first communication device 210, via the TXABB 440, the local oscillator 430, the transmission and/or reception conversion switch 421, the divider/combiner 420, and the filter 410, which are included in the first transmission and/or reception stream circuit 401 of the fifth communication circuit 400. The wireless modem 570 may forward, by using the fifth connection member 580, the test signal to the fourth communication device 240, via the transmission mixer 322b on a transmit path, the divider 320b, the plurality of transmission and/or reception sub circuits 310-0 to 310-15 included the transmission and/or reception circuit 310, the plurality of first switches 610-0 to 610-15, and the second switch 620, of the first communication device 210. The wireless modem 570 may forward, by using the fourth connection member 284, the test signal to the fifth communication circuit 400, via the fifth switch 650, the sixth switch 660, the reception mixer 322a on a receive path, and the transmission and/or reception conversion switch 323, of the fourth communication device 240. The wireless modem 570 may receive the test signal via the filter 410, the divider/combiner 420, the transmission and/or reception conversion switch 421, the local oscillator 430, and the RXABB 450, which are included in the second transmission and/or reception stream circuit 403.

Figure 6B:
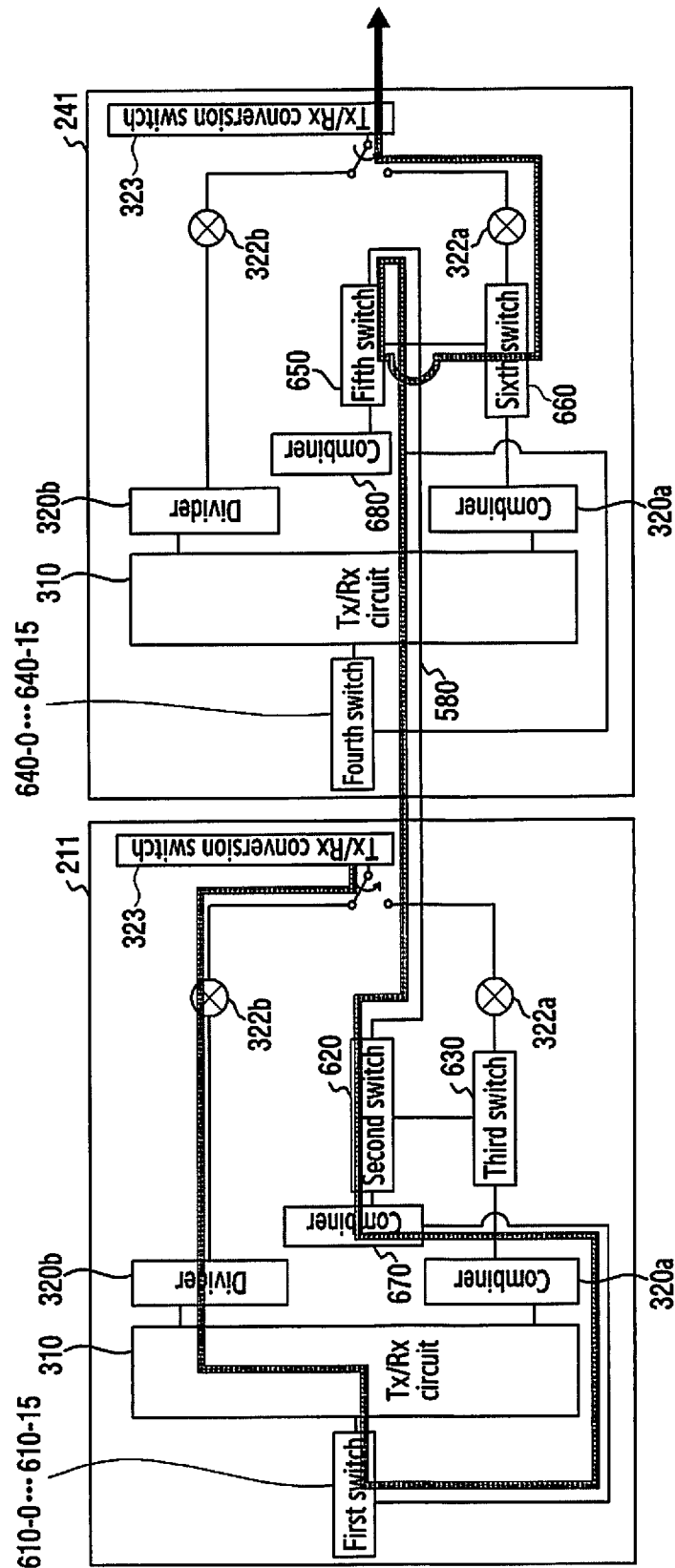
FIG. 6B illustrates a flow of a test signal, at calibration execution in an electronic device according to various embodiments of the present disclosure.

In accordance with various embodiments, referring to FIG. 6B, the test signal may be transmitted from the fifth communication circuit 400 to the first communication device 210 via the first connection member 281. The test signal may be forwarded to the transmission mixer 322b positioned on the transmit path via the transmission and/or reception conversion switch 323, and may be up converted into an RF signal of a wireless frequency band via the transmission mixer 322b and thereafter, may be divided into a plurality of test signals by the divider 320b. Thereafter, the plurality of test signals may be amplified by the plurality of transmission and/or reception sub circuits 310-0 to 310-15 included in the transmission and/or reception circuit 310, and may be combined into one signal by the plurality of first switches 610-0 to 610-15 and the combiner 670, which are positioned in a next stage of the plurality of transmission and/or reception sub circuits 310-0 to 310-15. The combined signal may be transmitted to the fourth communication device 240, by being transmitted from the second switch 620 of the first communication device 210 to the fifth switch 650 of the fourth communication device 240 via the fifth connection member 580. By receiving the test signal via the fifth switch 650 and transmitting the test signal to the sixth switch 660 and the reception mixer 322a which correspond to the receive path, the fourth communication device 240 may down convert an RF signal into an IF signal of an intermediate frequency band, and forward the test signal to the wireless modem 570 via the fourth connection member 284. Accordingly, calibration on the loopback path inside the electronic device 101 may be performed.

In accordance with various embodiments, the wireless modem 570 may receive a test signal whose phase and amplitude have been changed, via the transmission and/or reception sub circuits 310-0 to 310-15 of the first communication device 210. By receiving a test signal which has passed through the plurality of transmission and/or reception sub circuits 310-0 to 310-15, the wireless modem 570 may obtain information on a corresponding gain variation and an I/Q parameter mismatch extent when actually transmitting and/or receiving a signal with an external device. On the basis of the obtained information, the wireless modem 570 may change a circuit set value to match to a gain and an I/Q parameter which are designed by the first communication device 210, the fourth communication device 240 and the fifth communication circuit 400.

The electronic device 101 of various embodiments may include a first communication device 210, a second communication device (e.g., the fourth communication device 240), a source RF circuit (e.g., the fifth communication circuit 400), a first connection member 281 configured to connect the source RF circuit (e.g., the fifth communication circuit 400) and the first communication device 210, a second connection member (e.g., the fourth connection member 284) configured to connect the source RF circuit (e.g., the fifth communication circuit 400) and the second communication device (e.g., the fourth communication device 240), a third connection member (e.g., the fifth connection member 580) configured to connect the first communication device 210 and the second communication device (e.g., the fourth communication device 240), a wireless modem 570 operatively (or operably) coupled with the source RF circuit (e.g., the fifth communication circuit 400), and a housing (not shown) including the wireless modem 570, the source RF circuit (e.g., the fifth communication circuit 400), the first communication device 210, the second communication device (e.g., the fourth communication device 240), and the first connection member 281 to the third connection member (e.g., the fifth connection member 580). The source RF circuit (e.g., the fifth communication circuit 400) may be configured to present a first signal received from the wireless modem 570, to the first communication device 210 via the first connection member 281. The first communication device 210 may be configured to present a second signal provided based on the first signal, to the second communication device (e.g., the fourth communication device 240) via the third connection member (e.g., the fifth connection member 580). The second communication device (e.g., the fourth communication device 240) may be configured to present a third signal provided based on the second signal, to the source RF circuit (e.g., the fifth communication circuit 400) via the second connection member (e.g., the fourth connection member 284). The source RF circuit (e.g., the fifth communication circuit 400) may be configured to present the third signal received from the second communication device (e.g., the fourth communication circuit 240), to the wireless modem.

The wireless modem 570 of various embodiments may be configured to perform calibration, on the basis of the third signal received from the source RF circuit (e.g., the fifth communication circuit 400) and the first signal transmitted from the wireless modem 570 to the source RF circuit (e.g., the fifth communication circuit 400).

The first communication device 210 of various embodiments may include at least one of a first switch 510, a second switch 520, a third switch 530, a plurality of transmission and/or reception sub circuits 310-0 to 310-15 included in a transmission and/or reception circuit 310, a combiner 320a, a divider 320b, a reception mixer 322a, a transmission mixer 322b, and a filter 327.

The second communication device (e.g., the fourth communication device 240) of various embodiments may include at least one of a fourth switch 540, a fifth switch 550, a sixth switch 560, the plurality of transmission and/or reception sub circuits 310-0 to 310-15 included in the transmission and/or reception circuit 310, the combiner 320a, the divider 320b, the reception mixer 322a, the transmission mixer 322b, and the filter 327.

The transmission and/or reception sub circuits 310-0 to 310-15 of various embodiments may include at least one of a power amplifier (PA) 313, a phase shifter (PS) 314, a phase shifter drive amplifier (PSDA) 315, and a pre power amplifier (PPA) 316 which are arranged in a transmit path, and include at least one of a low noise amplifier (LNA) 311 and a PS 312 which are arranged in a receive path.

The third connection member (e.g., the fifth connection member 580) of various embodiments may include a first path corresponding to a section from the third switch 530 to the second switch 520, a second path corresponding to a section from the second switch 520 to the fifth switch 550, and a third path corresponding to a section from the fifth switch 550 to the fourth switch 540.

In accordance with various embodiments, the first switch 510 may be arranged to correspond to a receive path of the first communication device 210. The second switch 520 may be configured to connect the first communication device 210 and the second communication device (e.g., the fourth communication device 240). The third switch 530 may be arranged to correspond to a transmit path of the first communication device 210. The fourth switch 540 may be arranged to correspond to a receive path of the second communication device (e.g., the fourth communication device 240). The fifth switch 550 may be configured to connect the first communication device 210 and the second communication device (e.g., the fourth communication device 240). The sixth switch 560 may be configured to correspond to a receive path of the second communication device (e.g., the fourth communication device 240).

In accordance with various embodiments, the electronic device 101 may further include a printed circuitry board (PCB) arranged inside the housing. The source RF circuit (e.g., the fifth communication circuit 400) and the wireless modem 570 may be arranged on the PCB arranged inside the housing. The first communication device 210 may be arranged at a first position of a remaining region excepting the PCB, inside the housing. The second communication device (e.g., the fourth communication device 240) may be arranged at a second position of the remaining region excepting the PCB, inside the housing, and the second position may be different from the first position.

In accordance with various embodiments, the first communication device 210 may further include switches 610-0 to 610-15 of a number corresponding to the number of the transmission and/or reception sub circuits 310-0 to 310-15, and a combiner 320a positioned between the switches 610-0 to 610-15 and the second switch 520. The switches 610-0 to 610-15 may be configured to be positioned between the plurality of transmission and/or reception sub circuits 310-0 to 310-15 and a plurality of antennas.

In accordance with various embodiments, the wireless modem 570 may perform the calibration, by comparing a phase and amplitude of the first signal and a phase and amplitude of the third signal.

In accordance with various embodiments, the wireless modem 570 may transmit a control signal to the first switch 510 to the sixth switch 560.

In accordance with various embodiments, the first switch 510 to the sixth switch 560 may be changed from a first state to a second state by receiving the control signal.

In accordance with various embodiments, the first state may correspond to a state for activating a path for signal transmission and/or reception with an external device, and the second state may correspond to a state for activating a path for calibration within the electronic device 101.

In accordance with various embodiments, the second path (e.g., the fifth connection member 580), the first connection member 281, and the second connection member (e.g., the fourth connection member 284) may correspond to one of a coaxial cable or a flexible PCB (FPCB).

The electronic device 101 of various embodiments may include a housing (not shown), a first antenna element (e.g., the antenna module 505 included in the first communication device 210) positioned inside the housing or at a first position thereof, a second antenna element (e.g., the antenna module 505 included in the fourth communication device 240) positioned inside the housing or at a second position separated from the first position, and a wireless communication circuit positioned inside the housing, and electrically coupled with the first antenna element (e.g., the antenna module 505 included in the first communication device 210) and the second antenna element (e.g., the antenna module 505 included in the fourth communication device 240). The wireless communication circuit may include a wireless modem 570, a source radio frequency (RF) circuit (e.g., the fifth communication circuit 400) electrically connected to the wireless modem 570, and configured to provide an intermediate frequency (IF) signal, a first RF circuit (e.g., the first communication circuit 211) positioned at a third position closer to the first position than the second position, and a second RF circuit (e.g., the fourth communication circuit 241) positioned at a fourth position closer to the second position than the first position. The first RF circuit (e.g., the first communication circuit 211) and the second RF circuit (e.g., the fourth communication circuit 241) may be configured to alternately receive an IF signal for transmitting a transmitted signal, through the first antenna element (e.g., the antenna module 505 included in the first communication device 210) and the second antenna element (e.g., the antenna module 505 included in the fourth communication device 240), and include a first electrical path (e.g., the first connection member 281) between the source RF circuit (e.g., the fifth communication circuit 400) and the first RF circuit (e.g., the first communication circuit 211), a second electrical path (e.g., the fourth connection member 284) between the source RF circuit (e.g., the fifth communication circuit 400) and the second RF circuit (e.g., the fourth communication circuit 241), and a third electrical path (e.g., the fifth connection member 580) between the first RF circuit (e.g., the first communication circuit 211) and the second RF circuit (e.g., the fourth communication circuit 241). The first RF circuit (e.g., the first communication circuit 211) may be configured to, while being electrically blocked from the first antenna element (e.g., the antenna module 505 included in the first communication device 210), form at least a part of a first loopback path, from the first RF circuit (e.g., the first communication circuit 211) to the source RF circuit (e.g., the fifth communication circuit 400), via the third electrical path (e.g., the fifth connection member 580) and the second electrical path (e.g., the fourth connection member 284). The second RF circuit (e.g., the fourth communication circuit 241) may be configured to, while being electrically blocked from the second antenna element (e.g., the antenna module 505 included in the fourth communication device 240), form at least a part of a second loopback path, from the second RF circuit (e.g., the fourth communication circuit 241) to the source RF circuit (e.g., the fifth communication circuit 400), via the third electrical path (e.g., the fifth connection member 580) and the first electrical path (e.g., the first connection member 281).

At least one of the first electrical path (e.g., the first connection member 281) to the third electrical path (e.g., the fifth connection member 580) of various embodiments may include a coaxial cable or a flexible printed circuitry board (FPCB).

The first RF circuit (e.g., the first communication circuit 211) of various embodiments may include a first transmit path, a first receive path, a first switch (e.g., the third switch 530) within the first transmit path, a second switch (e.g., the second switch 520) electrically connected to the first switch (e.g., the third switch 530) and a first end stage of the third electrical path (e.g., the fifth connection member 580), and a third switch (e.g., the first switch 510) within the first receive path. The third switch (e.g., the first switch 510) may be electrically connected to the second switch (e.g., the second switch 520). The first RF circuit (e.g., the first communication circuit 211) may be configured to present a first loopback signal from the first switch (e.g., the third switch 530), via the second switch (e.g., the second switch 520), the third electrical path (e.g. the fifth connection member 580), and the second electrical path (e.g., the fourth connection member 284).

The second RF circuit (e.g., the fourth communication circuit 241) of various embodiments may include a second transmit path, a second receive path, a fourth switch (e.g., the sixth switch 560) within the second transmit path, a fifth switch (e.g., the fifth switch 550) electrically connected to the fourth switch (e.g., the sixth switch 560) and a second end stage of the third electrical path (e.g., the fifth connection member 580), and a sixth switch (e.g., the fourth switch 540) within the second transmit path. The sixth switch (e.g., the fourth switch 540) may be electrically connected to the fifth switch (e.g., the fifth switch 550). The second RF circuit (e.g., the fourth communication circuit 241) may be configured to present a second loopback signal from the fourth switch (e.g., the sixth switch 560), via the fifth switch (e.g., the fifth switch 550), the third electrical path (e.g. the fifth connection member 580), the second switch (e.g., the second switch 520), the third switch (e.g., the first switch 510), and the first electrical path (e.g., the first connection member 281).

At least one of the first switch (e.g., the third switch 530) to the sixth switch (e.g., the fourth switch 540) of various embodiments may include a single pole double throw (SPDT) switch.

The IF signal of various embodiments may correspond a frequency of 8 GHz to 14 GHz, and the transmitted signal may correspond to a frequency of 20 GHz to 60 GHz.

Figure 7:
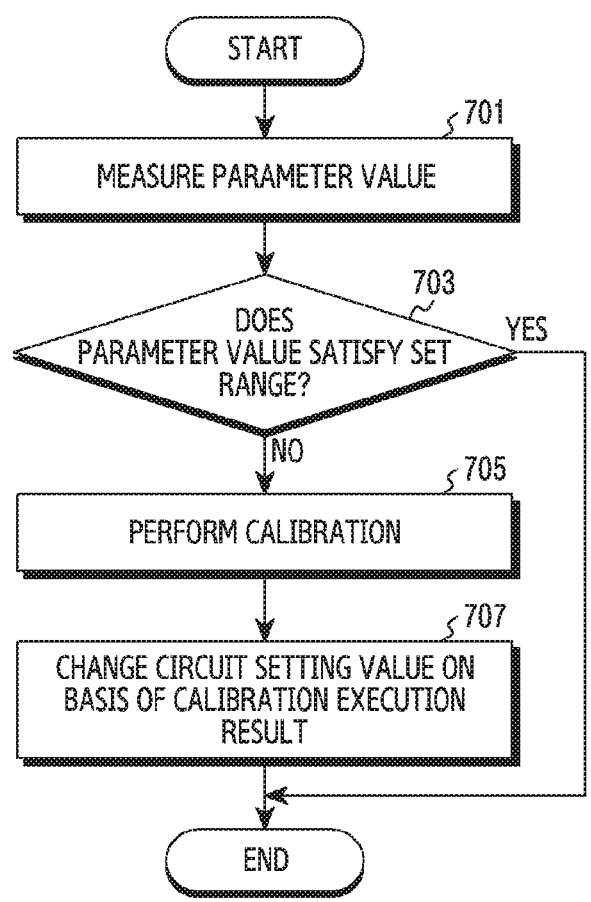
FIG. 7 illustrates a flowchart of performing calibration in an electronic device according to various embodiments of the present disclosure.

FIG. 7 illustrates a flowchart of performing calibration in an electronic device according to various embodiments of the present disclosure. FIG. 7 illustrates an operation method of the electronic device 101.

Referring to FIG. 7, in operation 701, the processor 270 (e.g., the processor 120 of FIG. 1) of the electronic device 101 may measure a parameter value. For example, the processor 270 may measure values related to internal calibration. On the basis of the parameter values, the processor 270 may calibrate errors on a frequency, a phase, timing, and a gain, of a signal dependent on a variation of a process voltage temperature (PVT). The parameter may be used to determine the execution or non-execution of calibration on the basis of a difference between a parameter value of a test signal the processor 270 transmits to the communication module 260 and a parameter value of a test signal the processor 270 receives from the communication module 260.

In operation 703, the processor 270 may judge whether the parameter value meets a set range. For example, the processor 270 may determine whether a measurement value on the parameter is included in a range of a first value to a second value. For example, the first value and the second value may be determined by a manufacturing company or a service providing company, or be changed.

In accordance with an embodiment, the processor 270 may obtain that the measurement value is included in the set range. The processor 270 may determine that the measurement value is a value which is greater than the first value and is less than the second value. The processor 270 may determine that calibration on a communication circuit (e.g., the first communication circuit 211, the second communication circuit 221, the third communication circuit 231, and the fourth communication circuit 241) and the communication module 260 for transmitting and/or receiving a signal of the electronic device 101 are not needed, and terminate the procedure.

In accordance with another embodiment, the processor 270 may obtain that the measurement value is not included in the set range. For example, the processor 270 may obtain that the measurement value is less than the first value, or is greater than the second value. On the basis of the measurement value, the processor 270 may determine to perform calibration on the communication circuit (e.g., the first communication circuit 211, the second communication circuit 221, the third communication circuit 231, and the fourth communication circuit 241) and the communication module 260.

In operation 705, the processor 270 may perform the calibration. In response to the measurement value not being included in the first value to the second value, the processor 270 may transmit a test signal. In accordance with an embodiment, the electronic device 101 may include the communication circuit (e.g., the first communication circuit 211, the second communication circuit 221, the third communication circuit 231, and the fourth communication circuit 241) and the fifth communication circuit 400. By transmitting the test signal to form a closed loop circuit between the fifth communication circuit 400 and the communication circuits (e.g., the first communication circuit 211, the second communication circuit 221, the third communication circuit 231, and the fourth communication circuit 241), the processor 270 may perform the calibration. For example, the test signal may be transmitted from the fifth communication circuit 400 to one communication circuit, and may be transmitted to another communication circuit different from the one communication circuit, and may be transmitted from the another communication circuit to the fifth communication circuit 400. In accordance with an embodiment, the processor 270 may transmit a control signal for a loopback path for forming a closed loop circuit, to the first communication circuit 211 and the fourth communication circuit 241.

In operation 707, the processor 270 may change a circuit set value on the basis of the calibration execution result. The processor 270 may obtain the execution result of calibration on the basis of a difference value between the transmitted test signal and a test signal received via the closed loop circuit. For example, by comparing in-phase (I) parameters, and quadrature (Q) parameters, of the transmitted test signal and the received test signal, the processor 270 may determine a change degree of a phase, and an amplitude, of the received test signal. For another example, by comparing gains of the transmitted test signal and the received test signal, the processor 270 may determine a difference with a gain value of a designed circuit. The processor 270 may change the circuit set value on the basis of the obtained calibration execution result. For example, the processor 270 may adjust a phase change degree of a signal on the basis of a mismatch of the I/Q parameter. For another example, the processor 270 may adjust a gain value of the entire transmission and/or reception circuit 310 on the basis of the comparison result of the gain value.

An operation method of the electronic device 101 of various embodiments may include providing a first signal, transmitting the first signal to a first communication device 210 via a first connection member 281, providing, by the first communication device 210, a second signal on the basis of the first signal, transmitting the second signal to a second communication device (e.g., the fourth communication device 240) via a third connection member (e.g., the fifth connection member 580), providing, by the second communication device (e.g., the fourth communication device 240), a third signal on the basis of the second signal, and transmitting the third signal to a source RF circuit (e.g., the fifth communication circuit 400) via a second connection member (e.g., the fourth connection member 284). The first connection member 281 may connect the source RF circuit (e.g., the fifth communication circuit 400) and the first communication device 210. The second connection member (e.g., the fourth connection member 284) may connect the source RF circuit (e.g., the fifth communication circuit 400) and the second communication device (e.g., the fourth communication device 240). The third connection member (e.g., the fifth connection member 580) may connect the first communication device 210 and the second communication device (e.g., the fourth communication device 240).

The operation method of the electronic device 101 of various embodiments may further include performing calibration on the basis of the third signal and the first signal, and the calibration may be performed by comparing a phase and amplitude of the first signal and a phase and amplitude of the third signal.

Methods of embodiments mentioned in claims, or the specification, of the present disclosure may be implemented in the form of hardware, software, or a combination of hardware and software.

In response to being implemented by the software, a computer-readable storage media storing one or more programs (i.e., software modules) may be provided. The one or more programs stored in the computer-readable storage media are configured to be executable by one or more processors within an electronic device. The one or more programs include instructions for enabling the electronic device to execute methods of embodiments mentioned in claims, or the specification, of the present disclosure.

These programs (i.e., software modules and/or software) may be stored in a random access memory (RAM), a non-volatile memory including a flash memory, a read only memory (ROM), an electrically erasable programmable ROM (EEPROM), a magnetic disc storage device, a compact disc-ROM (CD-ROM), digital versatile discs (DVDs), an optical storage device of another form, and/or a magnetic cassette. Or, the program may be stored in a memory that is configured in combination of some or all of them. Also, each configured memory may be included in plural as well.

Also, the program may be stored in an attachable storage device that may access via a communication network such as the Internet, an intranet, a local area network (LAN), a wireless LAN (WLAN) or a storage area network (SAN), or a communication network configured in combination of them. This storage device may access a device performing an embodiment of the present disclosure via an external port. Also, a separate storage device on a communication network may access the device performing the embodiment of the present disclosure as well.

In the aforementioned concrete embodiments of the present disclosure, constituent elements included in the disclosure have been expressed in the singular form or plural form according to a proposed concrete embodiment. But, the expression of the singular form or plural form is selected suitable to a given situation for description convenience's sake, and the present disclosure is not limited to singular or plural components. Even a component expressed in the plural form may be constructed in the singular form, or even a component expressed in the singular form may be constructed in the plural form.

On the other hand, a detailed description of the present disclosure has been made for a concrete embodiment, but it is undoubted that various modifications are available without departing from the scope of the present disclosure. Therefore, the scope of the present disclosure should not be limited to and defined by the described embodiment and should be defined by not only claims mentioned below but also those being equivalent to these claims.

The invention claimed is:

1. An electronic device comprising:
a first communication device including a first antenna array;
a second communication device including a second antenna array;
a source radio frequency (RF) circuit;
a first connection member configured to electrically connect the source RF circuit and the first communication device;
a second connection member configured to electrically connect the source RF circuit and the second communication device;
a third connection member configured to electrically connect the first communication device and the second communication device; and
a wireless modem electrically connected with the source RF circuit,
wherein the source RF circuit is configured to transmit a first signal received from the wireless modem, to the first communication device via the first connection member,
wherein the first communication device is configured to transmit a second signal to the second communication device via the third connection member, the second signal corresponding a signal that the first signal passes through the first connection member,
wherein the second communication device is configured to transmit a third signal to the source RF circuit via the second connection member, the third signal corresponding a signal that the second signal passes through the third connection member,
wherein the source RF circuit is configured to transmit the third signal received from the second communication device, to the wireless modem, and
wherein the wireless modem is configured to:
compare the first signal and the third signal, and
perform calibration on the first communication device based on a result of comparing the first signal and the third signal.

2. The electronic device of claim 1, wherein the wireless modem is further configured to perform the calibration, by comparing a phase and amplitude of the first signal and a phase and amplitude of the third signal.

3. The electronic device of claim 1, wherein the first communication device further comprises at least one of a first switch arranged to correspond to a receive path of the first communication device, a second switch, a third switch, a plurality of transmission and/or reception sub circuits comprised in a transmission and/or reception circuit, a combiner, a divider, a reception mixer, a transmission mixer, and a filter,
the second communication device comprises a fourth switch, a fifth switch, a sixth switch, a plurality of transmission and/or reception sub circuits comprised in a transmission and/or reception circuit, a combiner, a divider, a reception mixer, a transmission mixer, and a filter, and
each of the transmission and/or reception sub circuits in the first and second communication devices comprises at least one of a power amplifier (PA), a phase shifter (PS), a phase shifter drive amplifier (PSDA), and a pre power amplifier (PPA) which are arranged in a transmit path, and comprise at least one of a low noise amplifier (LNA) and a PS which are arranged in a receive path.

4. The electronic device of claim 3, wherein the third connection member is configured to comprise:
a first path corresponding to a section from the third switch to the second switch;
a second path corresponding to a section from the second switch to the fifth switch; and
a third path corresponding to a section from the fifth switch to the fourth switch.

5. The electronic device of claim 4, wherein
the second switch is configured to connect the first communication device and the second communication device, the third switch is arranged to correspond to a transmit path of the first communication device, the fourth switch is arranged to correspond to a receive path of the second communication device, the fifth switch is configured to connect the first communication device and the second communication device, and the sixth switch is configured to correspond to a transmit path of the second communication device.

6. The electronic device of claim 4, wherein the second path, the first connection member, and the second connection member correspond to one of a coaxial cable or a flexible PCB (FPCB).

7. The electronic device of claim 3, wherein the wireless modem is further configured to transmit a control signal to the first switch to the sixth switch.

8. The electronic device of claim 7, wherein the first switch to the sixth switch are changed from a first state to a second state by receiving the control signal.

9. The electronic device of claim 8, wherein the first state corresponds to a state for activating a path for signal transmission and/or reception with an external device, and
the second state corresponds to a state for activating a path for calibration within the electronic device.

10. The electronic device of claim 1, further comprising:
a housing comprising the wireless modem, the source RF circuit, the first communication device, the second communication device, the first connection member, the second connection member, and the third connection member, and
a printed circuitry board (PCB) arranged inside the housing,
wherein the source RF circuit and the wireless modem are arranged on the PCB arranged inside the housing,
wherein the first communication device is arranged at a first position of a remaining region excepting the PCB, inside the housing, and
wherein the second communication device is arranged at a second position of the remaining region excepting the PCB, inside the housing, wherein the second position is different from the first position.

11. The electronic device of claim 1, wherein the first communication device further comprises first switches of a number corresponding to a number of a plurality of transmission and/or reception sub circuits and a combiner positioned between the switches and a second switch, and
wherein the first switches are configured to be positioned between the plurality of transmission and/or reception sub circuits and the first antenna array.

12. A method performed by an electronic device including a first communication device including a first antenna array, a second communication device including a second antenna array, a source radio frequency (RF) circuit, a first connection member connecting the source RF circuit and the first communication device, a second connection member connecting the source RF circuit and the second communication device, and a third connection member connecting the first communication device and the second communication device, the method comprising:
providing a first signal;
transmitting the first signal to the first communication device via the first connection member;
providing a second signal by the first communication device, the second signal corresponding a signal that the first signal passes through the first connection member;
transmitting the second signal to the second communication device via the third connection member;
providing a third signal by the second communication device, the third signal is a signal that the second signal passes through the third connection member;
transmitting the third signal to the source RF circuit via the second connection member;
comparing the first signal and the third signal; and
performing calibration on the first communication device based on a result of comparing the first signal and the third signal.

13. The method of claim 12,
wherein the calibration is performed by comparing a phase and amplitude of the first signal and a phase and amplitude of the third signal.

* * * * *